(12) United States Patent
Oho et al.

(10) Patent No.: US 9,424,645 B2
(45) Date of Patent: Aug. 23, 2016

(54) CALIBRATION DEVICE AND CALIBRATION METHOD FOR A STEREO CAMERA WITHOUT PLACING PHYSICAL MARKERS

(75) Inventors: Masahiro Oho, Shiga (JP); Hirofumi Nishimura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 289 days.

(21) Appl. No.: 14/123,946

(22) PCT Filed: May 23, 2012

(86) PCT No.: PCT/JP2012/003368
§ 371 (c)(1),
(2), (4) Date: Dec. 4, 2013

(87) PCT Pub. No.: WO2012/169131
PCT Pub. Date: Dec. 13, 2012

(65) Prior Publication Data
US 2014/0104393 A1  Apr. 17, 2014

(30) Foreign Application Priority Data
Jun. 6, 2011  (JP) .................................. 2011-126240

(51) Int. Cl.
*G01B 11/14* (2006.01)
*G06T 3/00* (2006.01)
(Continued)

(52) U.S. Cl.
CPC ............ *G06T 7/002* (2013.01); *H04N 13/0246* (2013.01); *G06T 2207/10012* (2013.01); *G06T 2207/30236* (2013.01)

(58) Field of Classification Search
CPC combination set(s) only.
See application file for complete search history.

(56) References Cited

U.S. PATENT DOCUMENTS

| 5,694,483 A | 12/1997 | Onoguchi |
| 7,149,327 B2 | 12/2006 | Okamoto et al. |
| 2003/0185421 A1 | 10/2003 | Okamoto et al. |

(Continued)

FOREIGN PATENT DOCUMENTS

| JP | 07334679 A | 12/1995 |
| JP | 10062145 A | 3/1998 |

(Continued)

OTHER PUBLICATIONS

International Search Report dated Jun. 26, 2012, for corresponding International Application No. PCT/JP2012/003368, 4 pages.

*Primary Examiner* — Dave Czekaj
*Assistant Examiner* — Alison Slater
(74) *Attorney, Agent, or Firm* — Seed IP Law Group PLLC

(57) ABSTRACT

Provided is a calibration device that can calculate the mounting state of a stereo camera without the placing of a physical marker. In this device, an area setting processor (113) preliminarily sets, for an integrated image in which a road surface image region and a setting-prohibited region are integrated, an arrangement pattern having a plurality of area setting frames, and adjusts the arrangement pattern so that the plurality of area setting frames recede from each other. An extraction processor (114) extracts from distance images a plurality of partial images corresponding to the plurality of area setting frames. A mounting-state calculation unit (104) calculates a mounting-state parameter on the basis of a plurality of partial images, such parameter relating to the mounting state of a stereo camera used to pick up stereo images.

12 Claims, 25 Drawing Sheets

(51) Int. Cl.
*G06T 7/00* (2006.01)
*H04N 13/02* (2006.01)

(56) References Cited

U.S. PATENT DOCUMENTS

2005/0237385 A1* 10/2005 Kosaka .................. G01B 11/00
348/42
2006/0013438 A1* 1/2006 Kubota ................. B60W 40/04
382/103
2006/0082879 A1* 4/2006 Miyoshi ............. H04N 13/0217
359/462
2010/0020178 A1* 1/2010 Kleihorst ................ G06T 7/002
348/175

FOREIGN PATENT DOCUMENTS

JP  2003288602 A  10/2003
JP  2006053755 A  2/2006

* cited by examiner

1101: ROAD SURFACE IMAGE REGION

1101:ROAD SURFACE IMAGE REGION

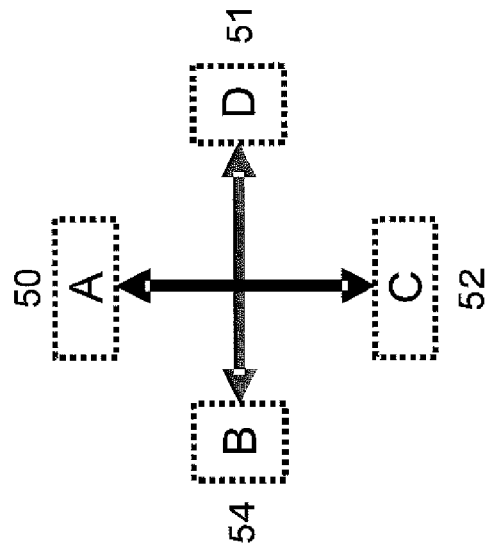
FIG. 23C
| ADJUSTMENT TARGET | PERMISSIBLE VALUE |
|---|---|
| A, C | 2 |
| B, D | 3 |
FIG. 23A
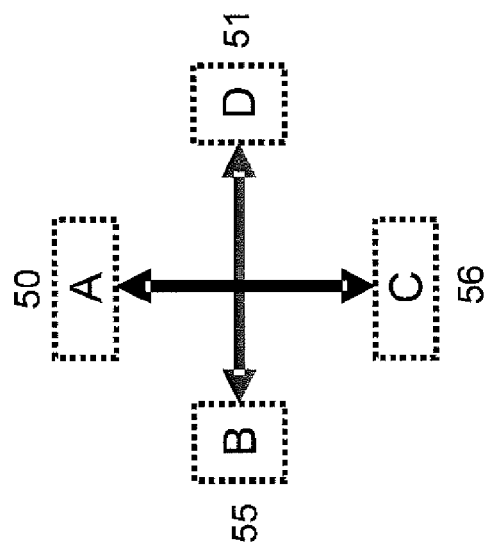
FIG. 23B

CALIBRATION DEVICE AND CALIBRATION METHOD FOR A STEREO CAMERA WITHOUT PLACING PHYSICAL MARKERS

TECHNICAL FIELD

The present invention relates to a calibration apparatus and a calibration method.

BACKGROUND ART

In recent years, in the field of Intelligent Transport System (ITS), research and development have been carried out on a technique that measures positional information of vehicles or pedestrians by using a stereo camera installed at an intersection or the like. The measured positional information is used for, for example, driving support for vehicles. In order to measure the positional information with high accuracy, the installation state of the stereo camera needs to be calculated with high accuracy, and a process of calculating the installation state of the stereo camera is referred to as "calibration."

Calibration methods of the related art include a method (hereinafter, referred to as "the related art") which is disclosed in Patent Literature (hereinafter, referred to as PTL) 1. In the related art, three-dimensional positions (x, y, and z) of three or more markers and two-dimensional positions (u and v) of each marker in an image are measured. Next, a rotation matrix T that converts a three-dimensional position into a two-dimensional position is obtained by using linear regression. The calculated rotation matrix T is expressed as a product of rotation matrixes around axes, and thus rotation angles ($\phi$, $\theta$, and $\psi$) around the axes are calculated. A rotation angle having a minimum difference S between the rotation matrix T and a rotation matrix T obtained by returning the calculated rotation angles to the product of the rotation matrixes is set to the installation state of the stereo camera.

CITATION LIST

Patent Literature

PTL 1
Japanese Patent Application Laid-Open No. HEI 10-62145

SUMMARY OF INVENTION

Technical Problem

Incidentally, in the related art, the calculation accuracy of the installation state of the stereo camera depends on the number of markers. That is, although it is possible to calculate the installation state of the stereo camera when at least three markers are present, the fewer the markers, the lower the calculation accuracy. In addition, in order to increase the calculation accuracy, the markers are required to be disposed in an image without deviation.

However, it is difficult to use the related art in a usage case where the stereo camera is installed at a high place in the vicinity of an intersection. This is because markers are required to be disposed on a road surface without deviation, while the intersection needs to be closed at the time of calibration in consideration of safety of work. Furthermore, the installation state of the stereo camera in a traffic environment is affected by wind or the like, so that the installation state of the stereo camera needs to be recalculated on a regular basis.

Therefore, in a usage case where a stereo camera is installed at an intersection or the like, it is difficult to actually put the related art into operation.

An object of the present invention is to provide a calibration apparatus and a calibration method capable of calculating an installation state of a stereo camera without physically disposing a marker.

Solution to Problem

A calibration apparatus according to an aspect of the present invention includes: a distance image generation section that calculates a distance from a stereo camera for each of a plurality of pixels included in a stereo image and that generates a distance image in which each of the plurality of pixels is associated with the calculated distance; a first region detection section that detects a road surface image region based on the stereo image; a second region detection section that detects a setting prohibited region including a group of non-effective pixels with which calculating the distance in the distance image is not possible; an area setting processing section that adjusts an arrangement pattern in a direction in which a plurality of area setting frames become distant from each other, based on the road surface image region and the setting prohibited region; an extraction processing section that extracts, from the distance image, a plurality of partial images corresponding to the plurality of area setting frames included in the adjusted arrangement pattern; and a calculation section that calculates an installation state parameter regarding an installation state of the stereo camera used for capturing of the stereo image, based on the plurality of extracted partial images.

A calibration method according to an aspect of the present invention includes: calculating a distance from a stereo camera for each of a plurality of pixels included in a stereo image; generating a distance image in which each of the plurality of pixels is associated with the calculated distance; detecting a road surface image region based on the stereo image; detecting a setting prohibited region including a group of non-effective pixels with which calculating the distance in the distance image is not possible; adjusting an arrangement pattern in a direction in which a plurality of area setting frames become distant from each other, based on the road surface image region and the setting prohibited region; extracting, from the distance image, a plurality of partial images corresponding to the plurality of area setting frames included in the adjusted arrangement pattern; and calculating an installation state parameter regarding an installation state of the stereo camera used for capturing of the stereo image, based on the plurality of extracted partial images.

Advantageous Effects of Invention

According to the present invention, it is possible to provide a calibration apparatus and a calibration method capable of calculating an installation state of a stereo camera without physically disposing a marker.

BRIEF DESCRIPTION OF DRAWINGS

FIGS. 23A to 23C are diagrams for describing a process of adjusting the number of pixels performed for each group while four road surface area images are divided into two groups;

DESCRIPTION OF EMBODIMENTS

Figure 1:
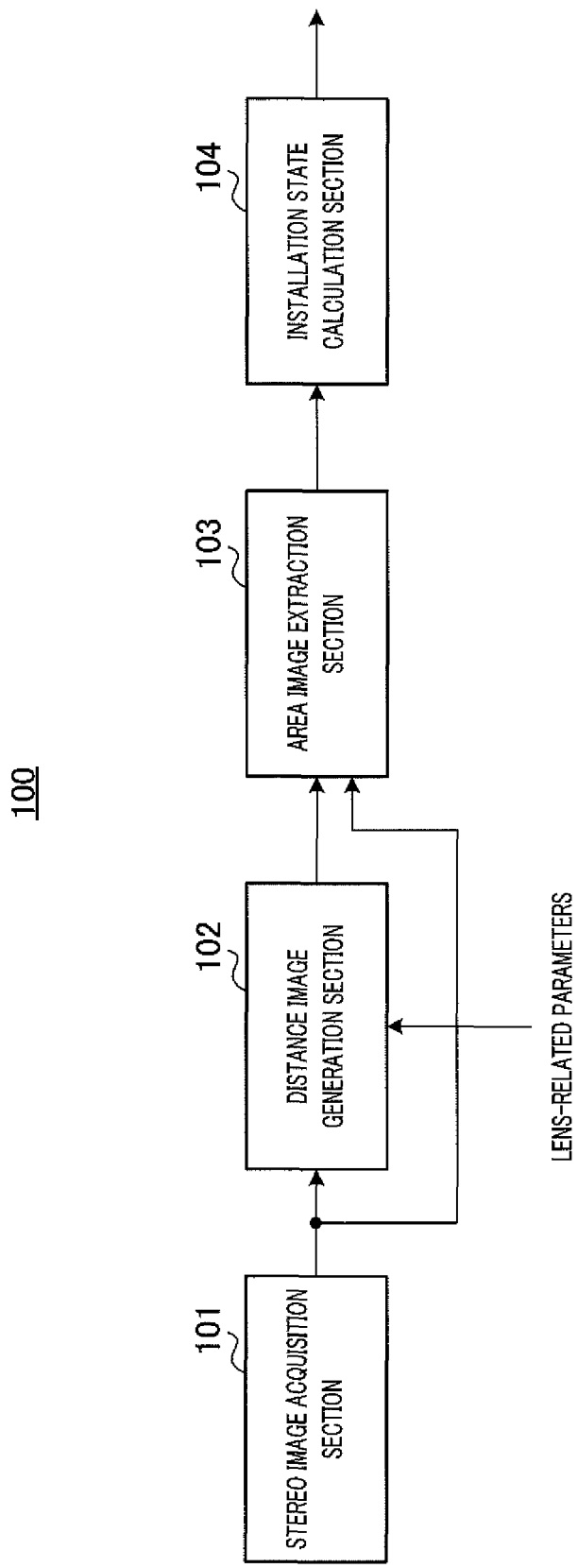
FIG. 1 is a block diagram illustrating a configuration of a calibration apparatus according to Embodiment 1 of the present invention.

Hereinafter, embodiments of the present invention will be described in detail with reference to the accompanying drawings. Meanwhile, in the embodiments, the same components will be denoted by the same reference numerals, and a description thereof will not be repeated.

Meanwhile, the inventor of this patent application has contrived the invention of this application on the basis of observation on the related art. That is, in the related art, three-dimensional positions of markers are measured using the principle of triangulation on the basis of parallax between two images captured by, for example, a stereo camera. The parallax between the two images is calculated using a variation in luminance or the like within the image. Thus, there is a possibility of the parallax not being calculated with high accuracy in an image region having little variation in luminance such as, for example, a shaded road surface in the image. For this reason, even if the physical arrangement of the markers has no operational problem, when the stereo camera is installed outdoors, there is a possibility of the number of markers capable of measuring a three-dimensional position varying for each image region in the image due to the influence of sunshine conditions or the like. When such a variation occurs, the calculation results of the installation state of the stereo camera greatly depend on the measurement results of the three-dimensional positions of the markers in a region where the three-dimensional positions of the large number of markers are measured. For this reason, when a stereo camera is installed in an outdoor location affected by sunshine conditions or the like, there is a possibility that the calculation accuracy of the installation state of the stereo camera cannot be sufficiently secured. The inventor has contrived the invention of this application on the basis of the above observation discussed above.

[Embodiment 1]

[Configuration of Calibration Apparatus 100]

FIG. 1 illustrates a configuration of calibration apparatus 100 according to Embodiment 1 of the present invention. In FIG. 1, calibration apparatus 100 includes stereo image acquisition section 101, distance image generation section 102, area image extraction section 103, and installation state calculation section 104.

Stereo image acquisition section 101 acquires a stereo image and outputs the acquired stereo image to distance image generation section 102 and area image extraction section 103. As described later, calibration apparatus 100 is provided in imaging apparatus 200 that is installed at an intersection or the like. Therefore, the stereo image that is acquired by stereo image acquisition section 101 includes a "road surface image region" and a "non-road surface image region."

Distance image generation section 102 receives a stereo image and lens-related parameters as input. The lens-related parameters include a focal length, a distortion coefficient, and a base line length.

Distance image generation section 102 corrects right and left distortion of the stereo image on the basis of the distortion coefficient. Distance image generation section 102 calculates a distance for each of unit regions (for example, pixels) on the basis of the corrected stereo image, and the focal length and the base line length which are included in the lens-related parameters. The distance is calculated using, for example, a stereo matching process. The calculated distance is equivalent to a distance between a camera and an object to be captured, at the time of capturing of the stereo image. Distance image generation section 102 generates a "distance image" in which each of the plurality of unit regions included in the stereo image is associated with the calculated distance. The generated distance image is output to area image extraction section 103. Meanwhile, when the stereo image does not have right and left distortion, the correction of the stereo image based on the distortion coefficient is not necessary.

Figure 2:
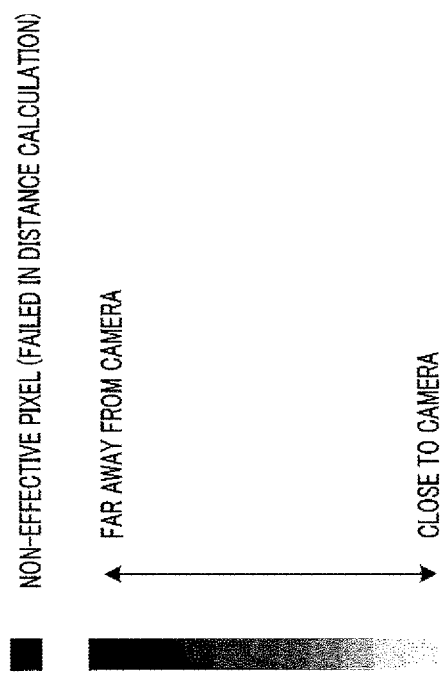
FIG. 2 is a diagram illustrating an example of a distance image.
Figure 2:
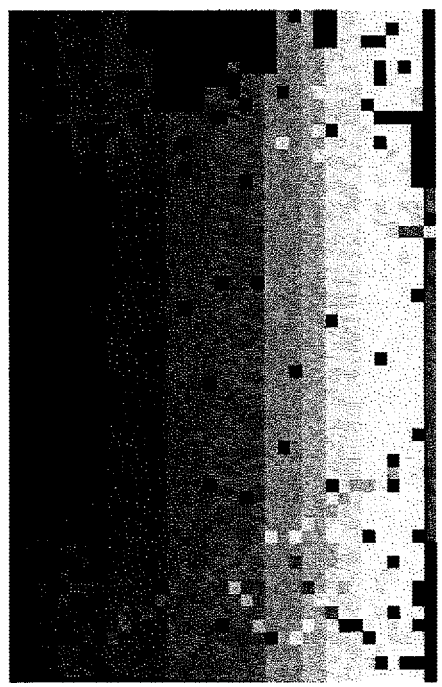

FIG. 2 illustrates an example of a distance image. In FIG. 2, as the calculated distance increases, the distance image is expressed by a deeper color, and as the calculated distance decreases, the distance image is expressed by a lighter color. However, pixels expressed by black (in other words, the deepest color) are pixels (hereinafter, referred to as "non-effective pixels") with which a distance cannot be calculated. Pixels other than the non-effective pixels are referred to as "effective pixels."

Area image extraction section 103 extracts a road surface area image on the basis of a stereo image, a distance image, and an arrangement pattern of a road surface area.

Here, the arrangement pattern has a plurality of area setting frames and a reference point. In the arrangement pattern, the reference point can be disposed at an arbitrary position. However, the plurality of area setting frames are preferably disposed at positions having rotational symmetry about the reference point.

Figures 3A, 3B:
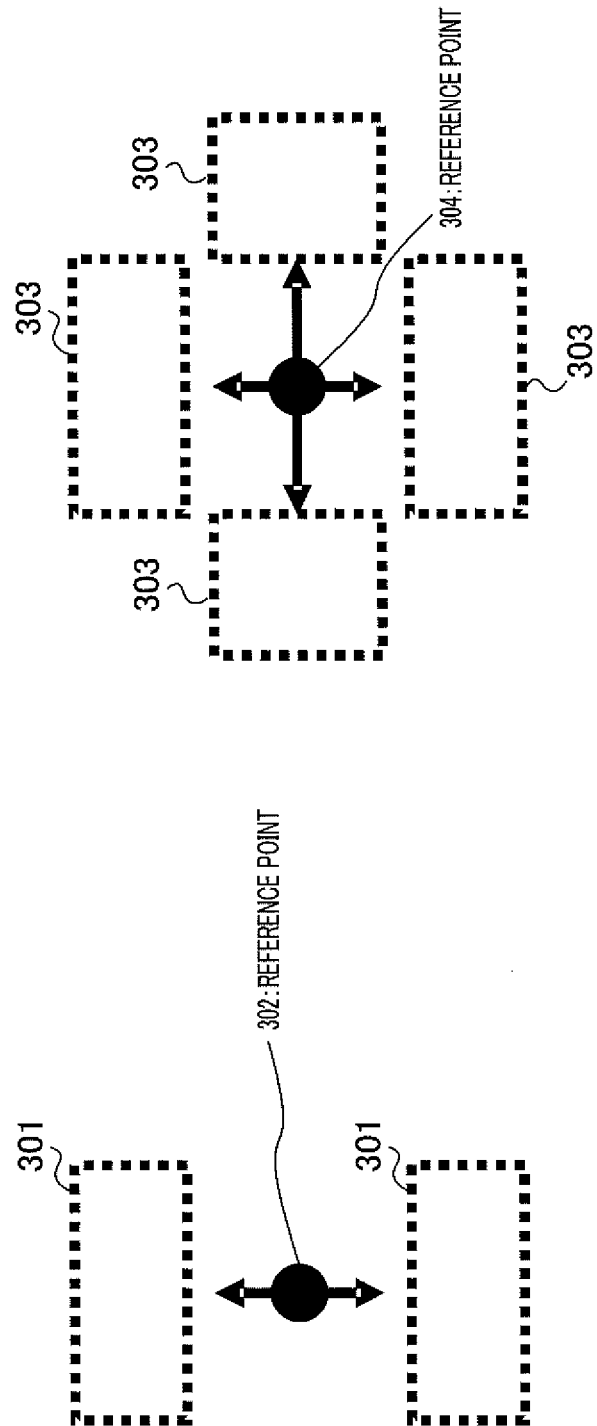
FIGS. 3A and 3B are diagrams each illustrating a variation in arrangement pattern of a road surface area.

FIGS. 3A and 3B illustrate variations in arrangement pattern of a road surface area. FIG. 3A illustrates an arrangement pattern that is appropriate for a case where a narrow-angle lens having a horizontal angle of approximately 30 degrees is used for capturing of a stereo image. The arrangement pattern illustrated in FIG. 3A has two area setting frames 301 and reference point 302. In addition, FIG. 3B illustrates an arrangement pattern that is appropriate for a case where a wide-angle lens having a horizontal angle of approximately 110 degrees is used for capturing of a stereo image. The arrangement pattern illustrated in FIG. 3A has four area setting frames 303 and reference point 304. That is, since an appropriate arrangement pattern varies in accordance with characteristics (such as, for example, large distortion of four corners) of the lens used for capturing of the stereo image, area image extraction section 103 may switch an arrangement pattern to be used, in accordance with characteristics of a lens to be used.

Figure 4:
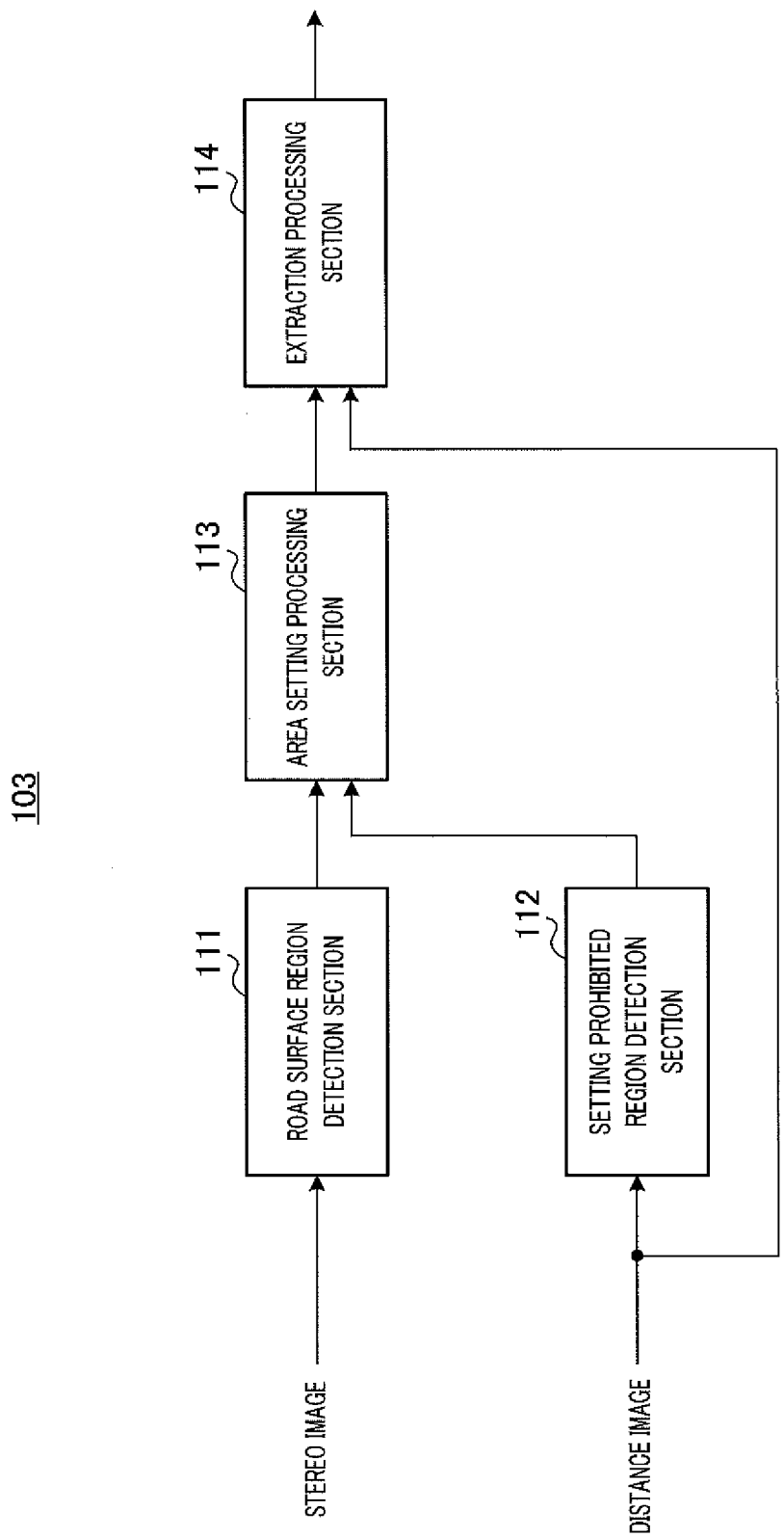
FIG. 4 is a diagram illustrating a configuration of an area image extraction section.

Specifically, as illustrated in FIG. 4, area image extraction section 103 includes road surface region detection section 111, setting prohibited region detection section 112, area setting processing section 113, and extraction processing section 114.

Road surface region detection section 111 detects a road surface image region that is estimated to be a road surface in a monocular image, on the basis of the monocular image included in a stereo image. A process of detecting the road surface image region can use a method that is used in the related art. For example, a method of detecting a road surface image region by detecting a white line on a road may be employed, or a method of detecting a road surface image region on the basis of color or luminance of a road may be employed.

Setting prohibited region detection section 112 detects a "setting prohibited region" on the basis of a distance image. The setting prohibited region is a region including a plurality of consecutive non-effective pixels in the distance image, and is an image region in which the setting of an arrangement pattern is prohibited. The setting of the arrangement pattern will be described later.

Area setting processing section 113 sets an arrangement pattern with respect to an integrated image in which the road surface image region detected by road surface region detection section 111 and the setting prohibited region detected by setting prohibited region detection section 112 are integrated. The integration of the road surface image region and the setting prohibited region will be described later.

Specifically, first, area setting processing section 113 temporarily sets an arrangement pattern by making the reference point positioned at the center of the integrated image.

Area setting processing section 113 adjusts the arrangement pattern. Specifically, area setting processing section 113 adjusts, in a state where the center of the integrated image is positioned at the reference point, the arrangement pattern by causing a plurality of area setting frames included in the arrangement pattern to be equally distant from the reference point up until immediately before each of the area setting frames and the setting prohibited region overlap each other while each of the area setting frames and the road surface image region overlap each other. After the adjustment of the arrangement pattern is completed, area setting processing section 113 uses the adjusted arrangement pattern as main setting.

Extraction processing section 114 extracts, from the distance image, a plurality of partial images (in other words, a plurality of road surface area images) which correspond to the plurality of area setting frames included in the arrangement pattern of which the main setting is performed by area setting processing section 113.

Installation state calculation section 104 calculates parameters (hereinafter, referred to as "installation state parameters") regarding an installation state of the stereo camera used for capturing of the stereo image, on the basis of the plurality of road surface area images extracted by area image extraction section 103. For example, the installation state parameters are a set of an installation height and an installation posture (in other words, set of pitch angle and roll angle). The installation state parameters can be calculated by employing a method that is used in the related art. For example, installation state calculation section 104 calculates three-dimensional positions of the effective pixels included in the plurality of road surface area images that are extracted by area image extraction section 103, and calculates the installation state parameters by performing a process such as linear regression on the calculated three-dimensional position.

[Configuration of Imaging Apparatus 200]

Figure 5:
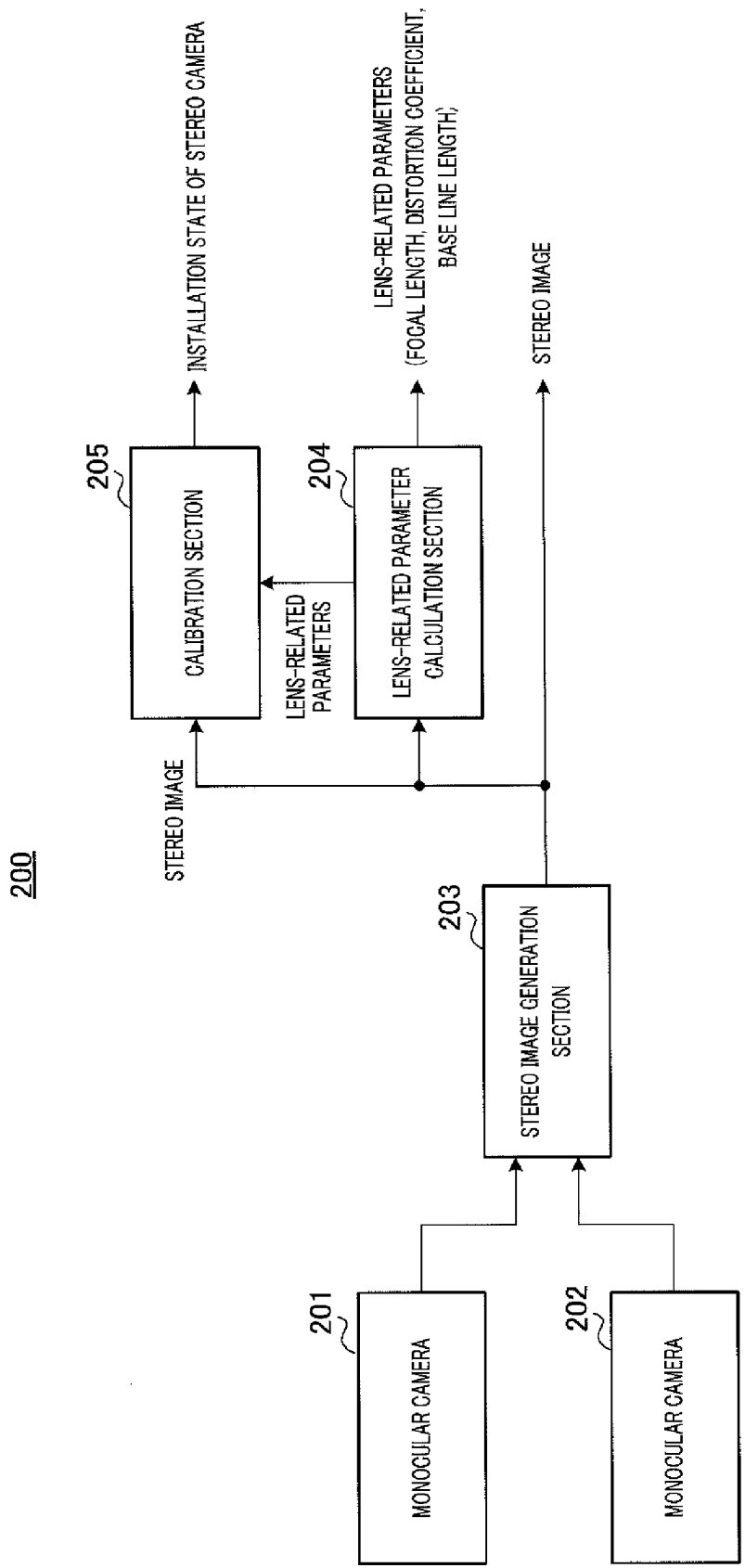
FIG. 5 is a block diagram illustrating a configuration of an imaging apparatus according to Embodiment 1 of the present invention.

FIG. 5 illustrates a configuration of imaging apparatus 200 according to Embodiment 1 of the present invention. In FIG. 5, imaging apparatus 200 includes monocular cameras 201 and 202, stereo image generation section 203, lens-related parameter calculation section 204, and calibration section 205. Calibration section 205 has the same configuration as the above-mentioned calibration apparatus 100. That is, imaging apparatus 200 includes calibration apparatus 100.

Each of monocular camera 201 and monocular camera 202 captures a monocular image and outputs the captured image to stereo image generation section 203.

Stereo image generation section 203 synchronizes monocular camera 201 and monocular camera 202, and generates a stereo image in which two monocular images acquired at the same timing are combined as a pair. The generated stereo image is output to lens-related parameter calculation section 204 and calibration section 205.

Lens-related parameter calculation section 204 analyzes the stereo image, and calculates lens-related parameters (focal length, distortion coefficient, and the like) of monocular camera 201 and monocular camera 202.

Figure 6:
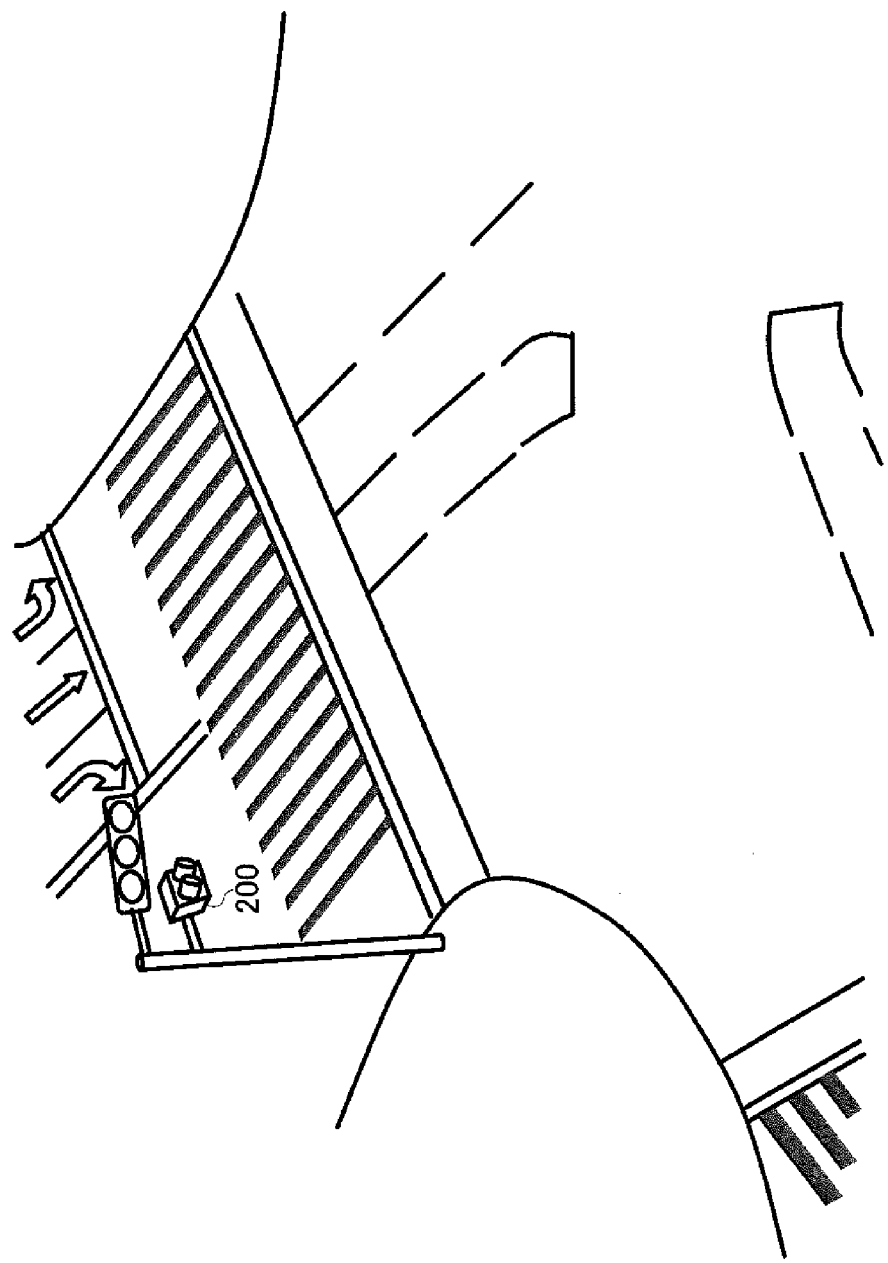
FIG. 6 is a diagram illustrating an image in which an imaging apparatus is installed at a traffic signal at an intersection.
Figure 7:
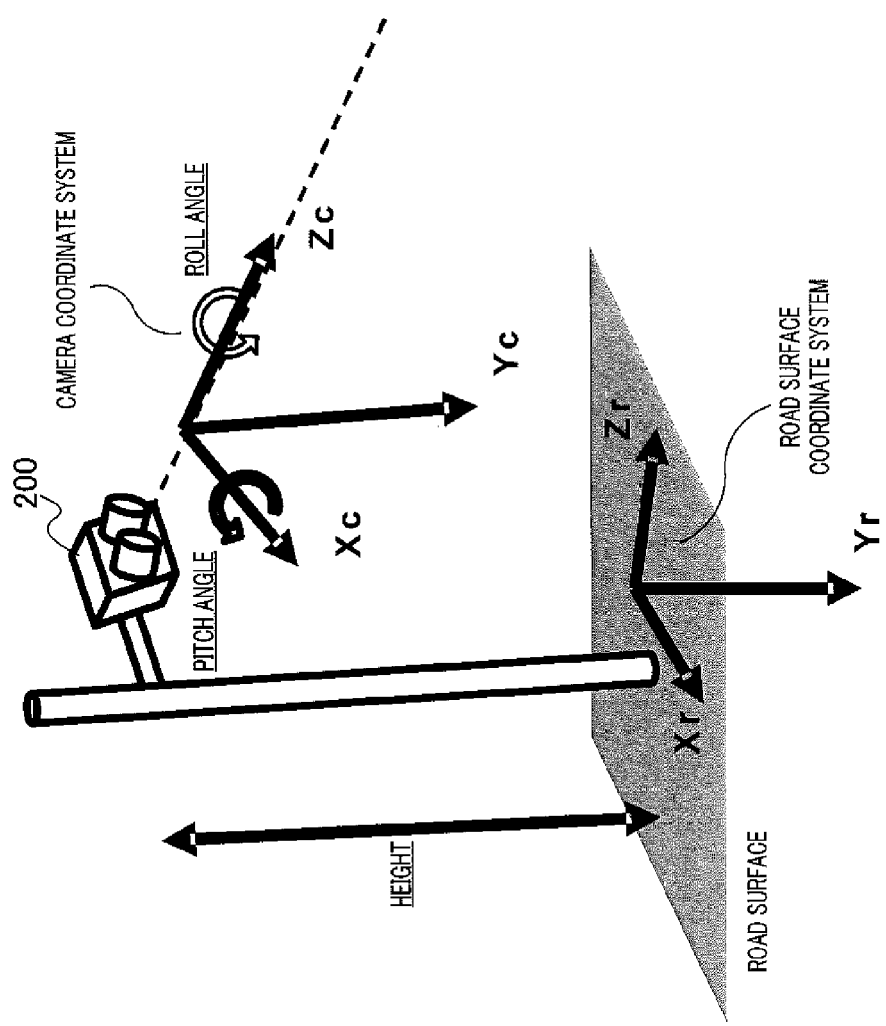
FIG. 7 is a diagram illustrating installation state parameters.
Figure 8B:
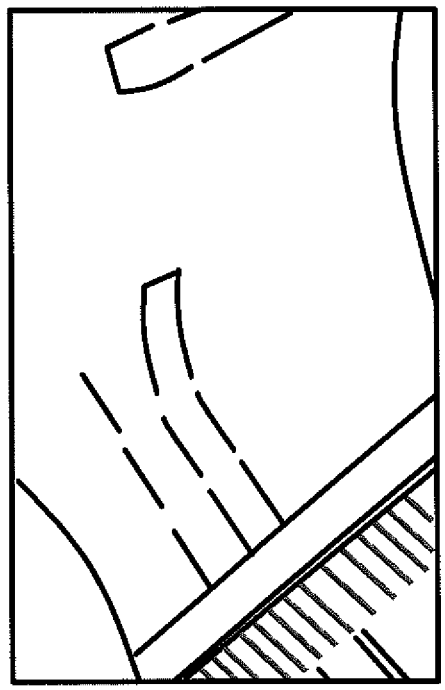
FIGS. 8A and 8B are diagrams each illustrating an example of a stereo image.
Figure 8A:
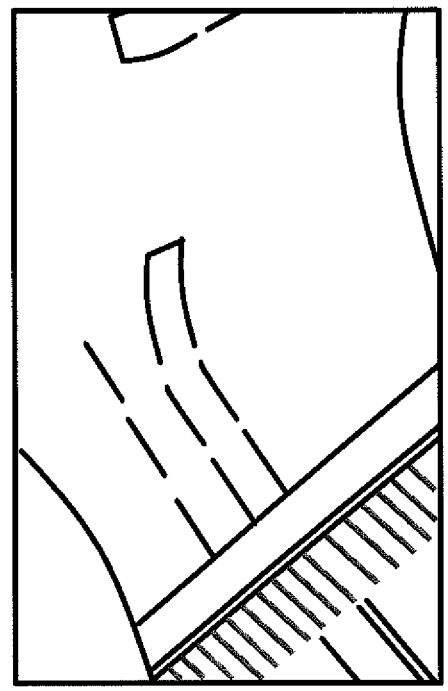

Here, imaging apparatus 200 is assumed to be used for detecting of accidents at an intersection or detecting of a suspicious person on the street. For this reason, imaging apparatus 200 is often installed so as to be capable of imaging an obliquely downward place from a relatively high position such as an upper part of a traffic signal or a telegraph pole. FIG. 6 illustrates an image in which imaging apparatus 200 is installed in a traffic signal at an intersection. In addition, FIG. 7 is a diagram illustrating installation state parameters. In particular, FIG. 7 illustrates installation state parameters in a situation where imaging apparatus 200 is installed in a traffic signal at an intersection. In addition, FIGS. 8A and 8B illustrate examples of a stereo image. FIG. 8A and FIG. 8B respectively illustrate images within an intersection which are captured by monocular camera 201 and monocular camera 202 at the same timing.

[Operation of Calibration Apparatus 100]

Figure 9:
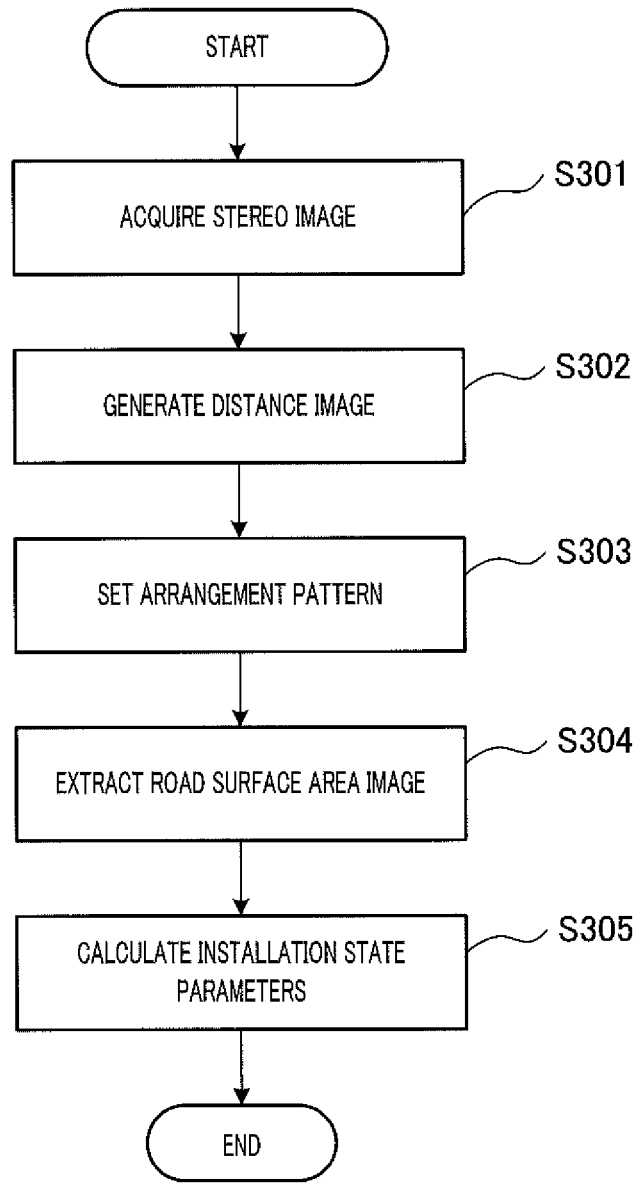
FIG. 9 is a flow chart illustrating an operation of a calibration apparatus.

An operation of calibration apparatus 100 having the above-mentioned configuration will be described below. FIG. 9 is a flow chart illustrating an operation of calibration apparatus 100.

(Acquisition of Stereo Image)

In step S301, stereo image acquisition section 101 acquires a stereo image. The stereo image is output to distance image generation section 102 and area image extraction section 103.

(Generation of Distance Image)

In step S302, distance image generation section 102 corrects right and left distortion of a stereo image on the basis of a distortion coefficient. Distance image generation section 102 calculates a distance for each of unit regions (for example, pixels) on the basis of the corrected stereo image, and the focal length and the base line length which are included in the lens-related parameters. In addition, the distance image generation section generates a "distance image" in which each of the plurality of unit regions included in the stereo image is associated with the calculated distance. The generated distance image is output to area image extraction section 103. Meanwhile, when the stereo image does not have right and left distortion, the correction of the stereo image based on the distortion coefficient is not necessary.

(Setting of Arrangement Pattern)

Figure 10:
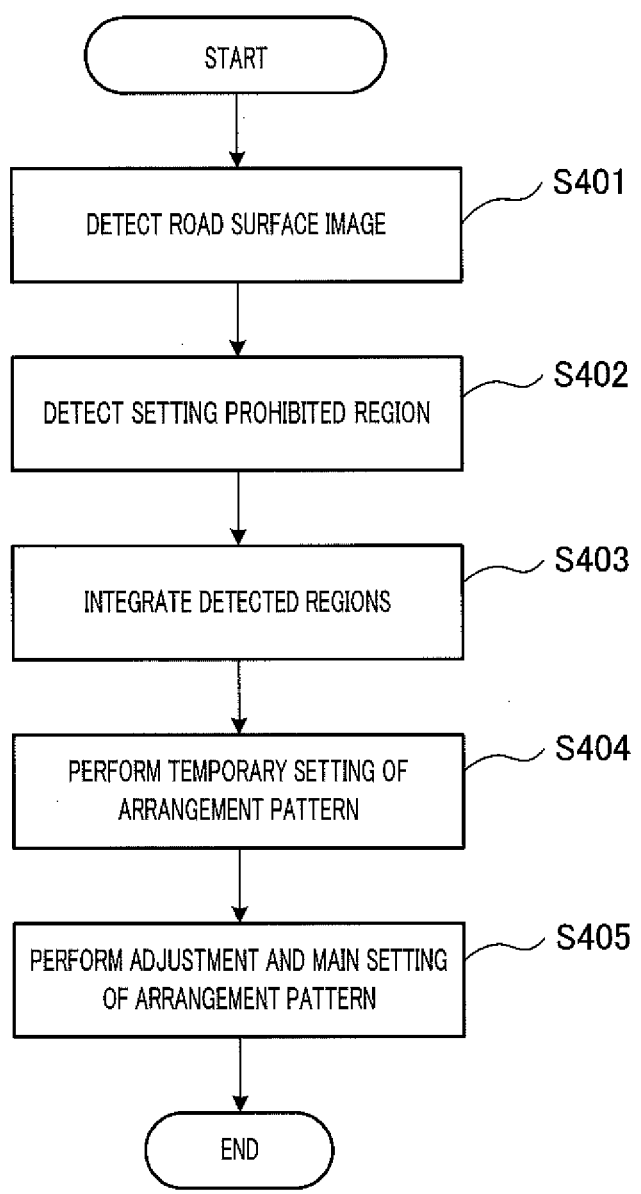
FIG. 10 is a detailed diagram illustrating an arrangement pattern setting process in an area image extraction section.

In step S303, area image extraction section 103 sets an arrangement pattern with respect to a distance image. FIG. 10 is a detailed diagram illustrating an arrangement pattern setting process in area image extraction section 103.

<Detection of Road Surface Image Region>

Figure 11A:
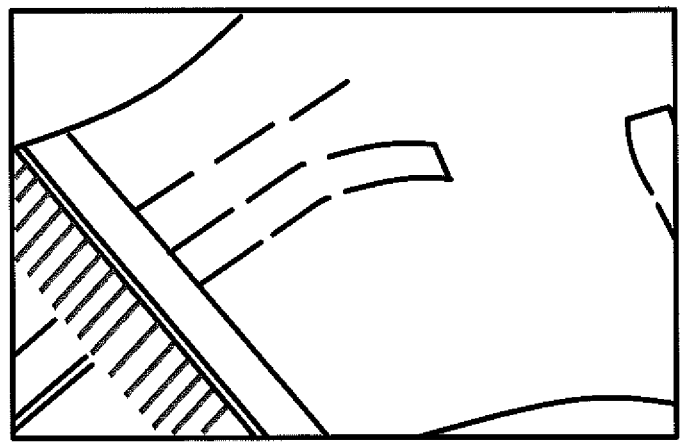
FIGS. 11A and 11B are diagrams for describing processing of a road surface region detection section.
Figure 11B:
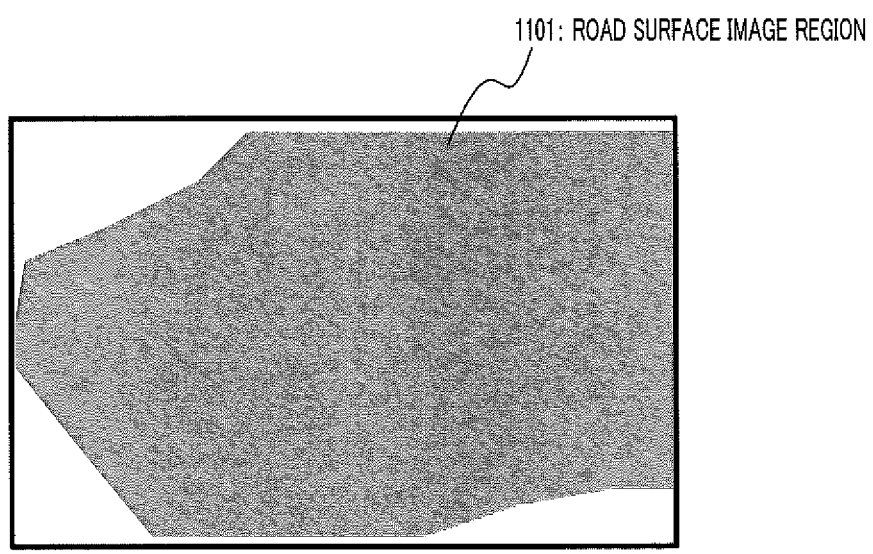

In step S401, road surface region detection section 111 detects a road surface image region that is estimated to be a road surface in a monocular image, on the basis of monocular images included in a stereo image. FIGS. 11A and 11B are diagrams for describing processing of road surface region detection section 111. FIG. 11A illustrates a monocular image, and FIG. 11B illustrates road surface image region 1101 that is detected on the basis of the monocular image of FIG. 11A.

<Detection of Setting Prohibited Region>

In step S402, setting prohibited region detection section 112 detects a "setting prohibited image region" of an arrangement pattern on the basis of a distance image.

Figure 12:
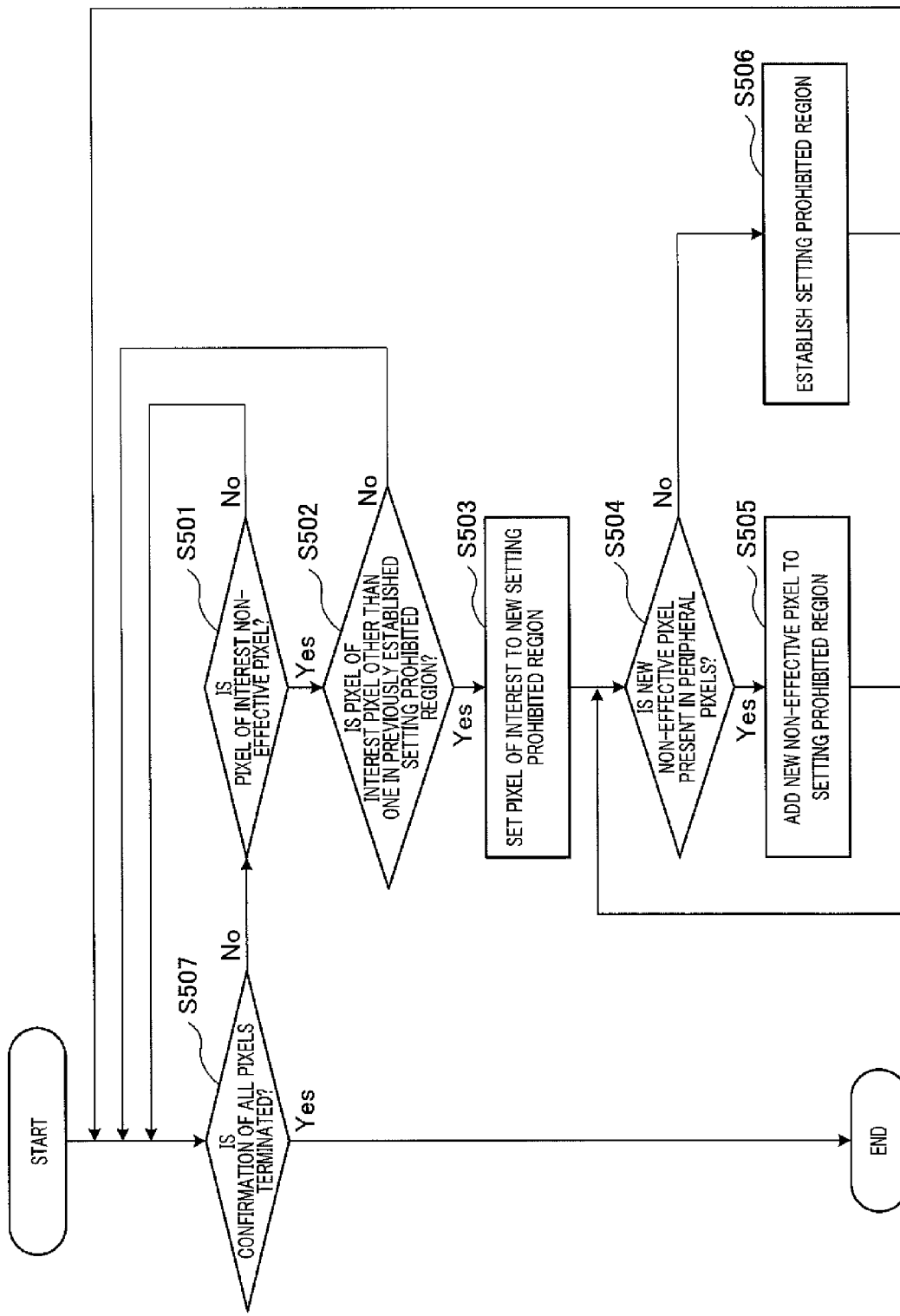
FIG. 12 is a flow chart illustrating processing of a setting prohibited region detection section.

FIG. 12 is a flow chart illustrating processing of setting prohibited region detection section 112.

In step S501, setting prohibited region detection section 112 determines whether a pixel of interest in a distance image is a non-effective pixel.

When the pixel of interest is a non-effective pixel (step S501:YES), setting prohibited region detection section 112 determines in step S502 whether the pixel of interest determined to be a non-effective pixel is a pixel that is not included in a previously established setting prohibited region.

When the pixel of interest determined to be a non-effective pixel is a pixel that is not included in a previously established setting prohibited region (step S502:YES), in step S503, setting prohibited region detection section 112 sets the pixel of interest as a new setting prohibited region.

In step S504, setting prohibited region detection section 112 determines whether a new non-effective pixel is present in peripheral pixels (in other words, eight pixels including upper and lower pixels, right and left pixels, an upper right pixel, a lower right pixel, an upper left pixel, and a lower left pixel) of the pixel of interest that is set as a new setting prohibited region.

When a new non-effective pixel is present (step S504: YES), in step S505, setting prohibited region detection section 112 adds the new non-effective pixel to the setting prohibited region. Then, the determination process of step S504 is performed on the new non-effective pixel added to the setting prohibited region.

On the other hand, when a new non-effective pixel is not present (step S504:NO), in step S506, setting prohibited region detection section 112 establishes one setting prohibited region.

The above-mentioned process is performed until all the pixels of the distance image are determined to be confirmed in step S507.

Figure 13A:
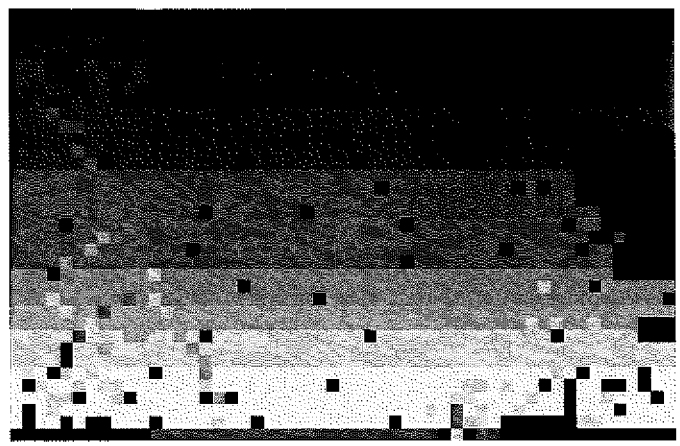
FIGS. 13A and 13B are diagrams for describing processing of the setting prohibited region detection section.
Figure 13B:
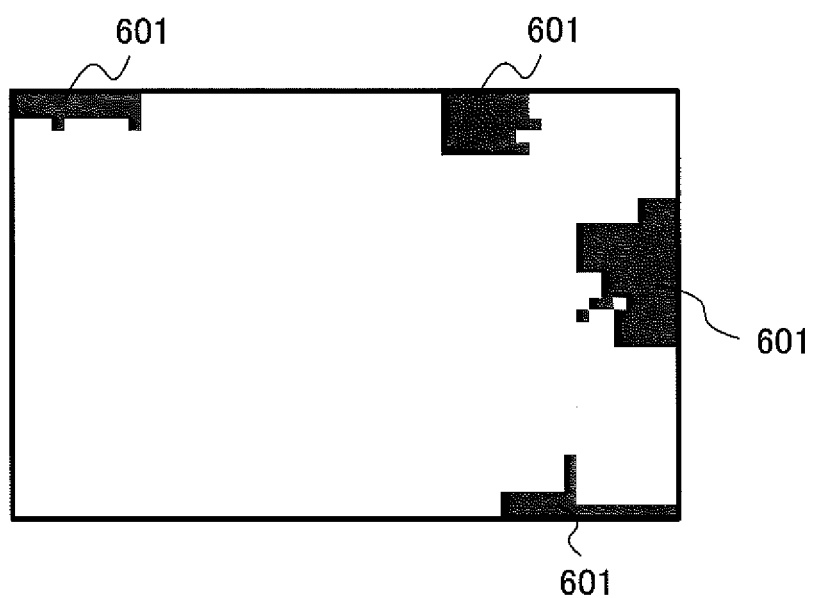

FIGS. 13A and 13B are diagrams for describing processing of setting prohibited region detection section 112. FIG. 13A illustrates a distance image, and FIG. 13B illustrates a setting prohibited region group (setting prohibited regions 601 in FIG.13B) which is detected on the basis of the distance image of FIG. 13A.

<Integration of Detected Region>

Figure 14B:
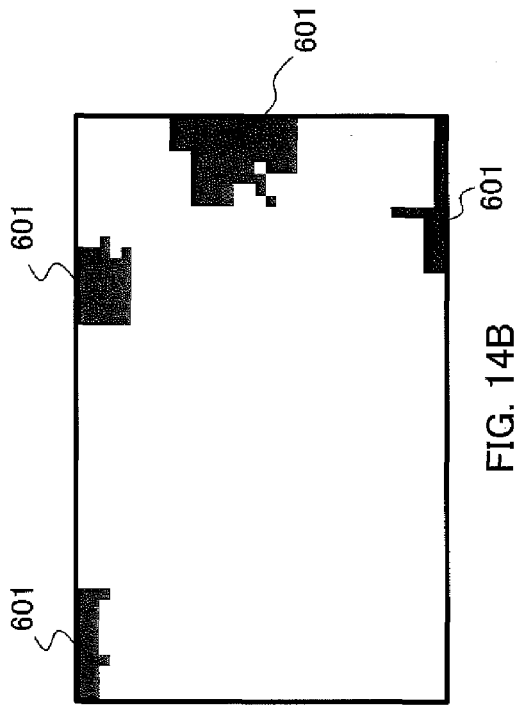
FIGS. 14A to 14C are diagrams for describing an integrated image.
Figure 14A:
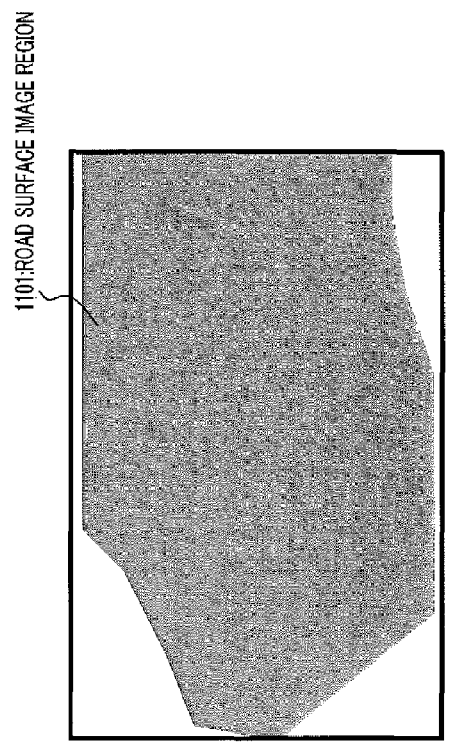
Figure 14C:
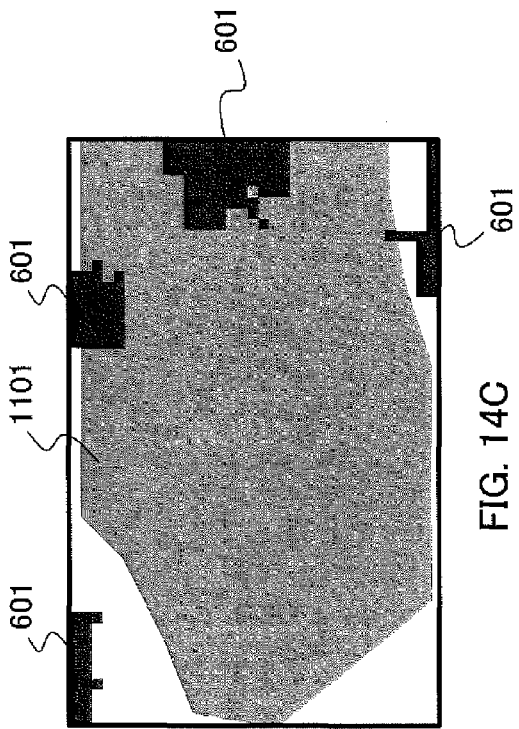

Referring back to FIG. 10, in step S403, area setting processing section 113 integrates the road surface image region detected by road surface region detection section 111 and the setting prohibited region detected by setting prohibited region detection section 112 to thereby generate an integrated image. FIGS. 14A to 14C are diagrams for describing an integrated image. FIG. 14A illustrates road surface image region 1101 that is detected by road surface region detection section 111, and FIG. 14B illustrates setting prohibited region 601 that is detected by setting prohibited region detection section 112. FIG. 14C illustrates an integrated image in which road surface image region 1101 and setting prohibited region 601 are integrated. For example, the integrated image is generated by superimposing setting prohibited region 601 on an image showing road surface image region 1101.

<Temporary Setting of Arrangement Pattern>

Figure 15:
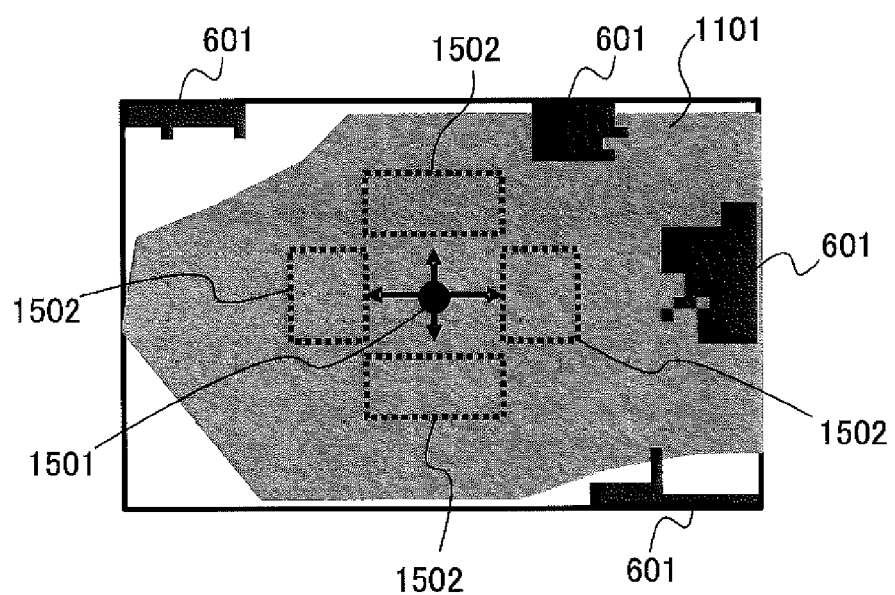
FIG. 15 is a diagram illustrating temporary setting of an arrangement pattern using an area setting processing section.

Referring back to FIG. 10, in step S404, area setting processing section 113 temporarily sets an arrangement pattern by making a reference point positioned at the center of an integrated image, as illustrated in FIG. 15. In the temporary setting, for example, area setting frame 1502 is disposed at a position closest to reference point 1501. Meanwhile, herein, an example in which the reference point is disposed at the center of the integrated image has been shown, but the present invention is not limited thereto. The reference point may be disposed at any position as long as it is a position at which the area setting frame corresponding to the reference point can be disposed within the integrated image.

<Adjustment and Main Setting of Arrangement Pattern>

In step S405, area setting processing section 113 adjusts an arrangement pattern. Specifically, area setting processing section 113 adjusts, in a state where the center of the integrated image is positioned at reference point 1501, the arrangement pattern by causing plurality of area setting frames 1502 included in the arrangement pattern to be distant from reference point 1501 up until immediately before each area setting frame 1502 and setting prohibited region 601 overlap each other while each area setting frame 1502 and road surface image region 1101 overlap each other. A direction in which area setting processing section 113 causes area setting frame 1502 to be distant from reference point 1501 is, for example, a direction of an arrow extending from reference point 1501 in FIG. 15.

Figure 16:
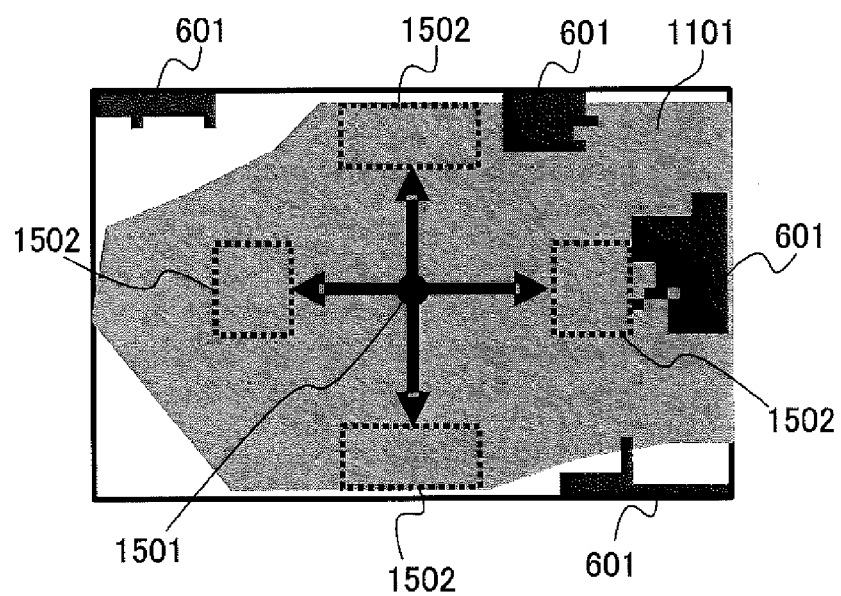
FIG. 16 is a diagram illustrating a setting situation of an arrangement pattern after an adjustment process.

That is, the process of adjusting an arrangement pattern is performed, and thus a temporary setting situation of an arrangement pattern illustrated in FIG. 15 is changed to a setting situation of an arrangement pattern illustrated in FIG. 16.

Here, the process of adjusting an arrangement pattern is performed in order to increase the calculation accuracy of installation state parameters. It is possible to increase the accuracy of a roll angle by increasing the distance between area setting frames lined up in a transverse direction, in a plurality of area setting frames included in an arrangement pattern. In addition, it is possible to increase the accuracy of a pitch angle by increasing the distance between area setting frames that are lined up in a longitudinal direction, in the plurality of area setting frames included in the arrangement pattern.

Meanwhile, herein, an example has been shown of adjustment that is performed so that any pixel of a setting prohibited region is not included within the plurality of area setting frames included in the arrangement pattern, but the present invention is not limited thereto. For example, a first threshold may be set in advance, and a number of pixels of the setting prohibited region which are included within the area setting frames may be permitted to be equal to or less than the first threshold. The first threshold is a natural number that is equal to or greater than 1.

After the adjustment of the arrangement pattern is completed, area setting processing section 113 uses the adjusted arrangement pattern illustrated in FIG. 16 as main setting.

(Extraction of Road Surface Area Image)

Referring back to FIG. 9, in step S304, extraction processing section 114 extracts, from the distance image, a plurality of partial images (in other words, plurality of road surface area images) which correspond to the plurality of area setting frames included in the arrangement pattern of which the main setting is performed by area setting processing section 113.

(Calculation of Installation State Parameters)

Then, in step S305, installation state calculation section 104 calculates installation state parameters on the basis of the plurality of road surface area images extracted by area image extraction section 103.

Figure 17:
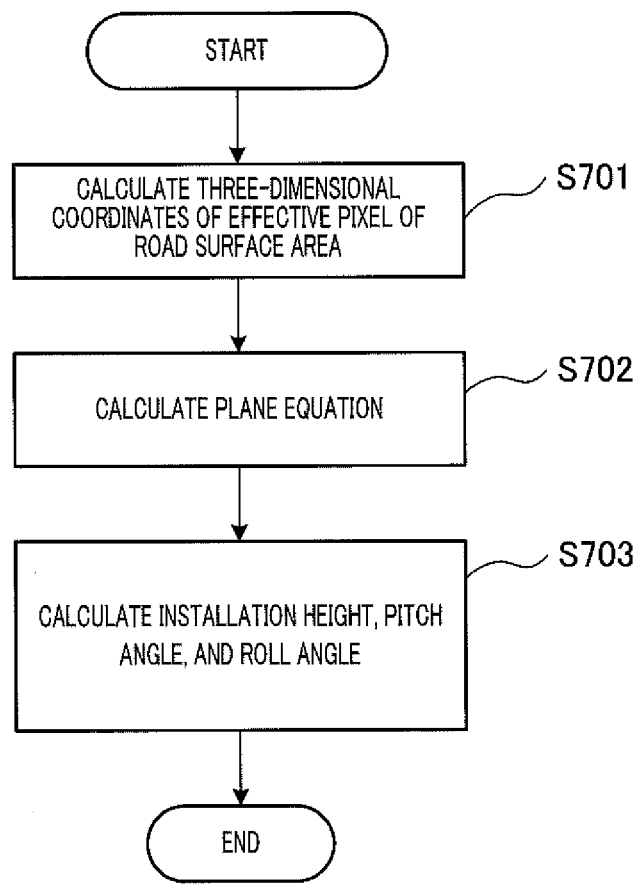
FIG. 17 is a flow chart illustrating a process of calculating installation state parameters.

FIG. 17 is a flow chart illustrating a process of calculating installation state parameters.

<Extraction of Three-Dimensional Coordinates>

In step S701, installation state calculation section 104 calculates three-dimensional coordinates of effective pixels of a plurality of road surface area images extracted by area image extraction section 103.

Figure 18:
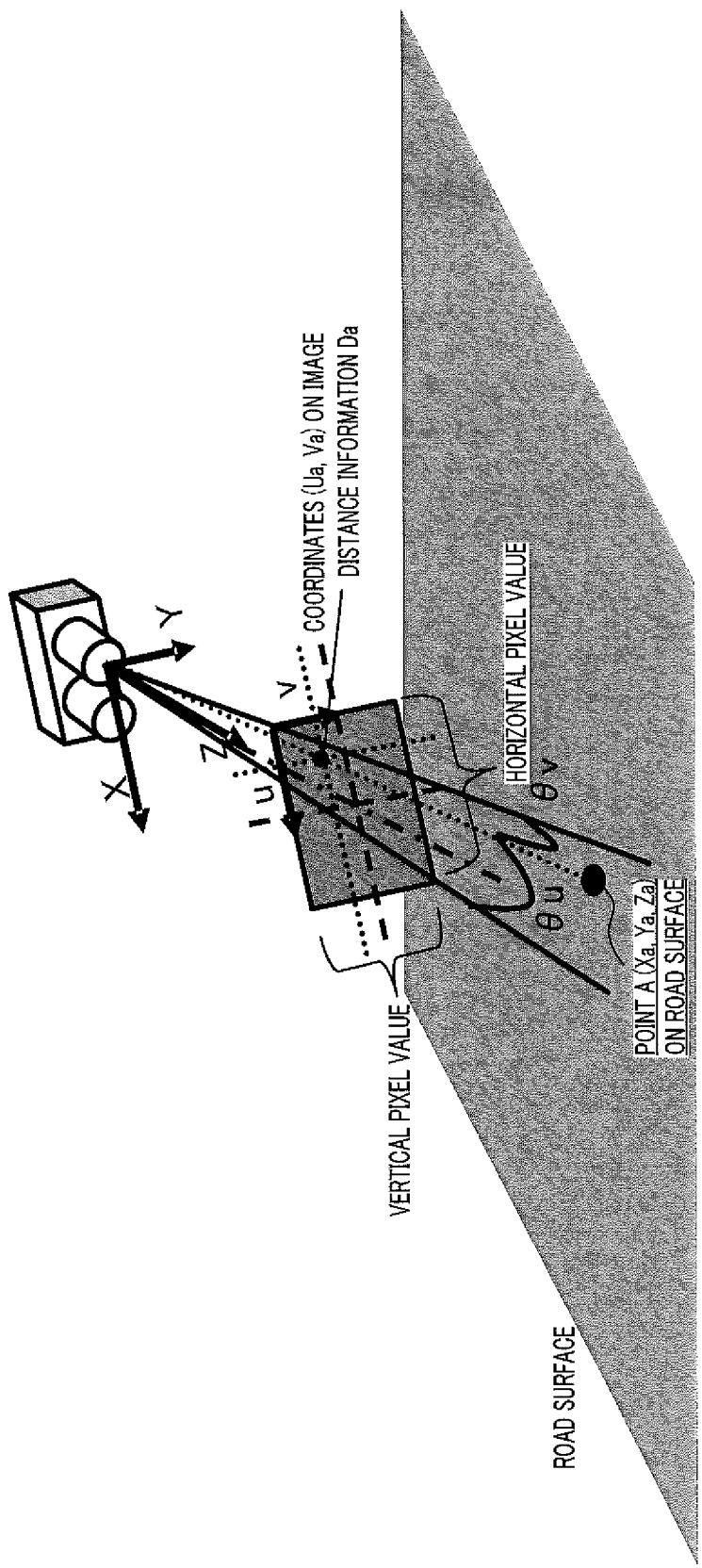
FIG. 18 is a diagram illustrating a method of calculating three-dimensional coordinates.

FIG. 18 is a diagram illustrating a method of calculating three-dimensional coordinates.

Three-dimensional coordinates (Xa, Ya, Za) of point A on a road surface are calculated by substituting two-dimensional coordinates (Ua, Va) on an image, distance information Da, vertical pixel value A and horizontal pixel value B which indicate the size of the image, and vertical view angle C and horizontal view angle D of a lens which are lens-related parameters into Equation 1.

[1]
$$Xa = Da \times \tan\left(\left(Ua - \frac{B}{2}\right) \times \frac{D}{B}\right)$$
$$Ya = Da \times \tan\left(\left(Va - \frac{A}{2}\right) \times \frac{C}{A}\right)$$
$$Za = Da$$
(Equation 1)

<Calculation of Plane Equation>

In step S702, installation state calculation section 104 calculates a plane equation of a road surface by performing multiple regression analysis or the like on the three-dimensional coordinates of the effective pixels which are calculated in step S701.

Specifically, the plane equation can be generally expressed as $Y = a + bX + cZ$. When the plane equation is expressed in a matrix format, Equation 2 is obtained.

[2]
$$\begin{bmatrix} Y1 \\ Y2 \\ \ldots \\ Yn \end{bmatrix} = \begin{bmatrix} 1 & X1 & Z1 \\ 1 & X2 & Z2 \\ \ldots & & \\ 1 & Xn & Zn \end{bmatrix} \begin{bmatrix} a \\ b \\ c \end{bmatrix}$$
(Equation 2)

Installation state calculation section 104 can calculate the plane equation of the road surface by substituting each of the three-dimensional coordinate groups calculated in step S701 into (X1, Y1, Z1), (X2, Y2, Z2), . . . , (Xn, Yn, Zn) in Equation 2 and by obtaining values of variables a, b, and c using multiple regression analysis.

<Calculation of Installation State Parameters>

In step S703, installation state calculation section 104 calculates installation state parameters on the basis of the plane equation that is calculated in step S702.

Specifically, installation height T within the installation state parameters can be regarded as a vertical distance from a starting point (0, 0, 0) to a plane. For this reason, the installation height within the installation state parameters can be calculated using Equation 3.

$$T = |-a|/\sqrt{(-a)^2 + (1)^2 + (-c)^2}$$
(Equation 3)

Roll angle R and pitch angle P are respectively a rotation angle (=pitch angle) around an X-axis and a rotation angle (=roll angle) around a Z-axis which are required for normalized normal vectors (Hx, Hy, Hz) of the plane to rotate to unit vectors (0, 1, 0) on a Y-axis. For this reason, the installation height within the installation state parameters can calculate the roll angle and the pitch angle by using Equation 4.

$$R = a\tan(Hx/Hy)$$

$$P = a\tan(-Hz/(Hx \times \sin(R) + Hy \times \cos(R)))$$

$$(Hx, Hy, Hz) = (-b/\sqrt{(-a)^2 + (1)^2 + (-c)^2},\ 1/\sqrt{(-a)^2 + (1)^2 + (-c)^2},\ -c/\sqrt{(-a)^2 + (1)^2 + (-c)^2})$$
(Equation 4)

Meanwhile, herein, a method of calculating a plane equation by regarding a road surface as a plane and by using multiple regression analysis has been exemplified as a method of calculating the installation state parameters, but the present invention is not limited thereto. For example, the method disclosed in PTL 1 may be used.

As described above, according to this embodiment, in calibration apparatus 100, area setting processing section 113 temporarily sets an arrangement pattern having a plurality of area setting frames with respect to an integrated image in which the road surface image region detected by road surface region detection section 111 and the setting prohibited region detected by setting prohibited region detection section 112 are integrated, and adjusts the temporarily set arrangement pattern in a direction in which the plurality of area setting frames become distant from each other on the basis of the road surface image region and the setting prohibited region. Then, extraction processing section 114 extracts a plurality of partial images (in other words, plurality of road surface area images) which correspond to the plurality of area setting frames included in the arrangement pattern adjusted by area setting processing section 113, from a distance image generated by distance image generation section 102. Then, installation state calculation section 104 calculates installation state parameters regarding an installation state of a stereo camera used for capturing of a stereo image, on the basis of the plurality of partial images extracted by extraction processing section 114.

In this manner, since the installation state parameters are calculated on the basis of the plurality of partial images extracted from the distance image by using the arrangement pattern having the plurality of area setting frames, calibration apparatus 100 can calculate the installation state parameters without physically disposing a marker. In addition, calibration apparatus 100 can increase the calculation accuracy of the installation state parameters by using the temporarily set arrangement pattern adjusted in a direction in which the plurality of area setting frames become distant from each other on the basis of the road surface image region and the setting prohibited region.

Specifically, area setting processing section 113 adjusts, in a state where the center of the integrated image is positioned at the reference point of the temporarily set arrangement pattern, the arrangement pattern by causing the plurality of area setting frames included in the temporarily set arrangement pattern to be mutually distant from the reference point up until immediately before each of the area setting frames and the setting prohibited region overlap each other while each of the area setting frames and the road surface image region overlap each other.

Figure 19B:
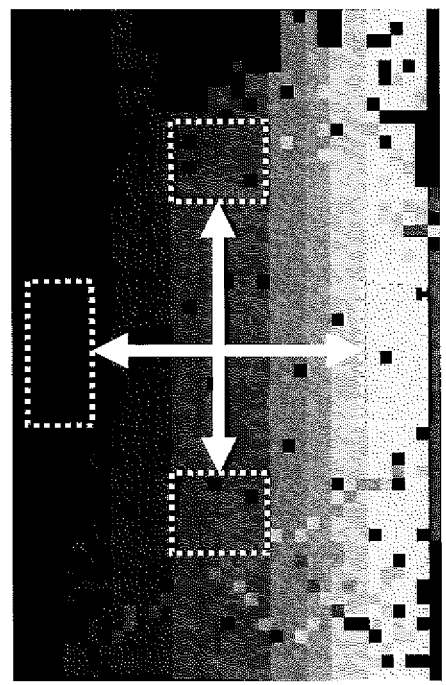
FIGS. 19A and 19B are diagrams each illustrating an example of a display image that is used in an adjustment step through a user's manual operation.
Figure 19A:
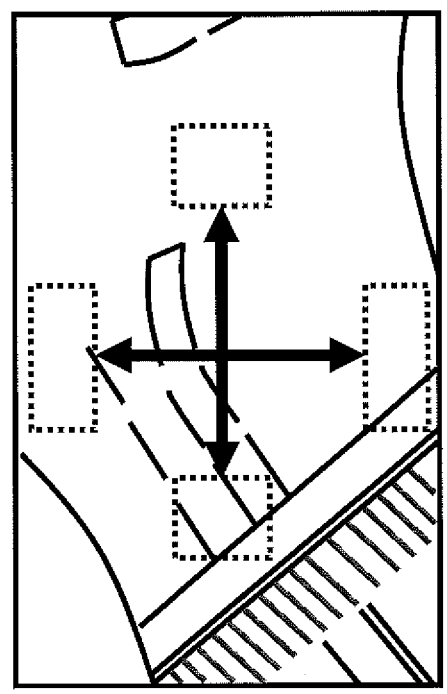

Meanwhile, in the above, a description is given of a process flow in which the adjustment of the arrangement pattern is performed in step S405 and then the main setting of the adjusted arrangement pattern is performed, but the present invention is not limited thereto. An adjustment step through a user's manual operation may be included between the adjustment and the main setting of the arrangement pattern. In this case, for example, an image illustrated in FIGS. 19A and 19B are displayed on a display section (not shown), and a user performs the fine adjustment of an arrangement pattern while viewing the displayed image. FIG. 19A illustrates a display image in which an adjusted arrangement pattern is superimposed on a monocular image. In addition, FIG. 19B illustrates a display image in which an adjusted arrangement pattern is superimposed on a distance image.

[Embodiment 2]

In Embodiment 1, a process of adjusting an arrangement pattern is performed on condition that any pixel of a setting prohibited region is not included in each of area setting frames included in the arrangement pattern or that the number of pixels of the setting prohibited region is equal to or less than a first threshold. Here, when the process of adjusting an arrangement pattern is performed on condition that the number of pixels of the setting prohibited region is equal to or less than the first threshold, it is also considered that the balance of the number of effective pixels between the road surface area images is lost. Consequently, in Embodiment 2, when the balance of the number of effective pixels between the road surface area images is lost, the balance of the number of effective pixels between the road surface area images is adjusted. Thus, it is possible to increase the calculation accuracy of an installation state of a stereo camera.

[Configuration of Calibration Apparatus 700]

Figure 20:
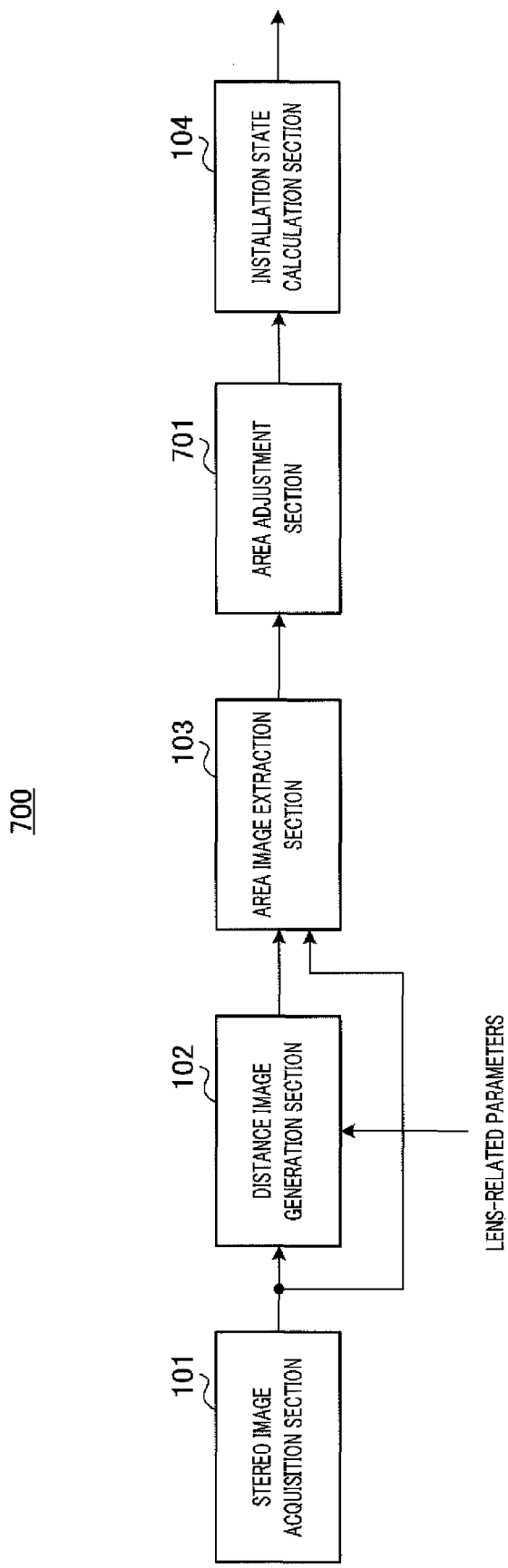
FIG. 20 is a block diagram illustrating a configuration of a calibration apparatus according to Embodiment 2 of the present invention.

FIG. 20 illustrates a configuration of calibration apparatus 700 according to Embodiment 2 of the present invention. In FIG. 20, calibration apparatus 700 includes area adjustment section 701.

In a plurality of road surface area images extracted by area image extraction section 103, when a difference between number P1 of effective pixels of a first road surface area image and number P2 of effective pixels of a second road surface area image (P1>P2) is greater than a second threshold, area adjustment section 701 reduces the number of effective pixels of the first road surface area image until the difference becomes equal to or less than the second threshold. The second threshold is a natural number equal to or greater than 1, and is smaller than a first threshold.

Specifically, area adjustment section 701 specifies a road surface area image (hereinafter, referred to as "minimum road surface area image") which has a minimum number of effective pixels in the plurality of road surface area images extracted by area image extraction section 103. Then, area adjustment section 701 reduces the number of effective pixels of each of the road surface area images other than the minimum road surface area image in the plurality of road surface area images extracted by area image extraction section 103, until a difference between the number of effective pixels of each of the road surface area images and the number of effective pixels of the minimum road surface area image becomes equal to or less than the second threshold.

Here, for example, any one of rules described below is used as a reduction rule.

(Rule 1) Effective pixels far away from a camera associated with a distance image are preferentially deleted.

(Rule 2) Effective pixels distant from the center of the distance image are preferentially deleted.

The pixel of rule 1 which is far away from the camera and the pixel of rule 2 which is distant from the center of the distance image generally have a lower distance calculation accuracy than a pixel close to the camera and a pixel in the vicinity of the center of the distance image. For this reason, area adjustment section 701 preferentially deletes such effective pixels, and thus the accuracy of three-dimensional coordinates used for calculating a plane equation using installation state calculation section 104 is increased, thereby increasing the calculation accuracy of installation state parameters.

[Operation of Calibration Apparatus 700]

An operation of calibration apparatus 700 having the above-mentioned configuration will be described below.

Figure 21:
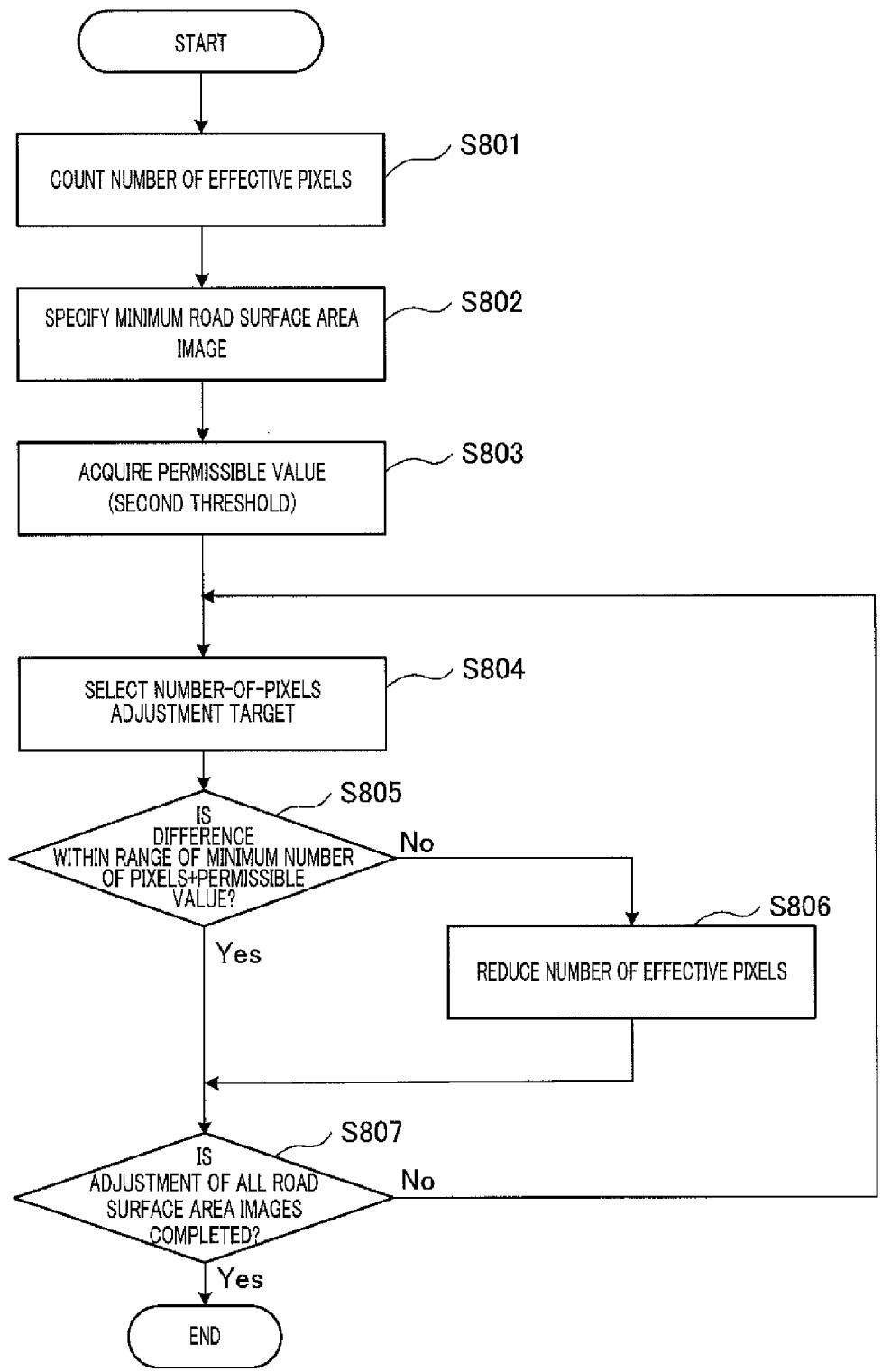
FIG. 21 is a flow chart illustrating an adjustment process between road surface area images using an area adjustment section.
Figure 22B:
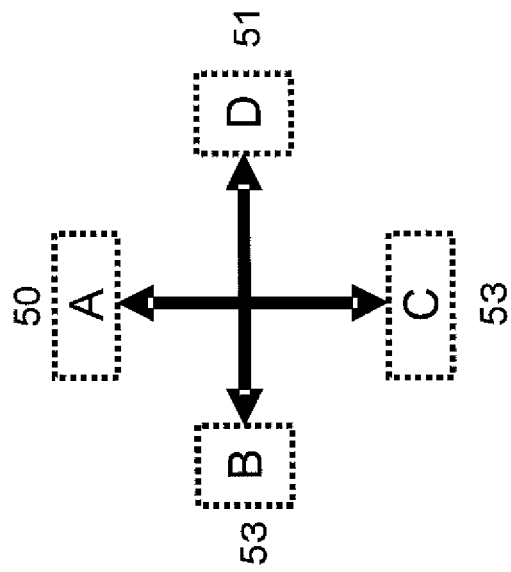
FIGS. 22A and 22B are diagrams for describing an adjustment process between road surface area images using an area adjustment section.
Figure 22A:
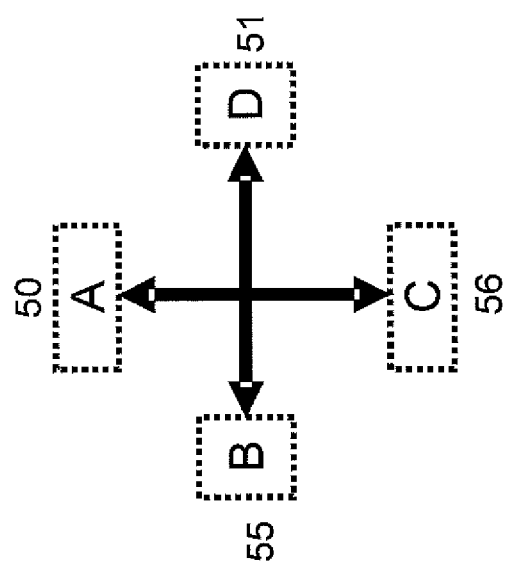

FIG. 21 is a flow chart illustrating a process of adjusting the balance of the number of effective pixels between road surface area images by using area adjustment section 701. FIGS. 22A and 22B are diagrams for describing the process of adjusting the balance of the number of effective pixels between the road surface area images by using area adjustment section 701.

In step S801, area adjustment section 701 counts the number of effective pixels of each of the plurality of road surface area images extracted by area image extraction section 103.

In FIG. 22A, the number of effective pixels of road surface area image A is set to 50, the number of effective pixels of road surface area image B is set to 55, the number of effective pixels of road surface area image C is set to 56, and the number of effective pixels of road surface area image D is set to 51.

In step S802, area adjustment section 701 specifies a minimum road surface area image in the plurality of road surface area images extracted by area image extraction section 103. That is, in the example illustrated in FIG. 22A, road surface area image A is specified as the minimum road surface area image.

In step S803, area adjustment section 701 acquires a permissible value (in other words, the above-mentioned second threshold). In the example illustrated in FIGS. 22A and 22B, the permissible value is set to 3.

In step S804, area adjustment section 701 selects one road surface area image (in other words, target road surface area image on which adjustment of number of pixels is to be performed) other than the minimum road surface area image in the plurality of road surface area images extracted by area image extraction section 103.

In step S805, area adjustment section 701 determines whether a difference between the number of effective pixels of the target road surface area image on which the adjustment of the number of pixels is to be performed and the number of effective pixels of the minimum road surface area image is equal to or less than the second threshold.

When it is determined in step S805 that the difference is greater than the second threshold (step S805:NO), in step S806, area adjustment section 701 reduces the number of effective pixels of the target road surface area image on which the adjustment of the number of pixels is to be performed, until the difference becomes equal to or less than the second threshold.

When it is determined in step S805 that the difference is equal to or less than the second threshold (step S805:YES), the process proceeds to step S807.

In step S807, area adjustment section 701 determines whether the adjustment of all the road surface area images is completed (in other words, whether all the road surface area images other than the minimum road surface area image have been selected as targets on which the adjustment of a number of pixels is to be performed).

When it is determined in step S807 that there is a road surface area image which has not been set as a target on which the adjustment of a number of pixels is to be performed, the process returns to step S804. Thus, the processes of step S804 to step S807 are repeated until the adjustment of the number of pixels is completed with respect to all the road surface area images other than the minimum road surface area image.

The processes of step S804 to step S807 are performed on the plurality of road surface area images illustrated in FIG. 22A, and thus a result illustrated in FIG. 22B is obtained. In FIG. 22B, the number of effective pixels of road surface area image A is 50, the number of effective pixels of road surface area image B is 53, the number of effective pixels of road surface area image C is 53, and the number of effective pixels of road surface area image D is 51. In addition, a difference between the number of effective pixels of each of road surface area images B, C, and D and the number of effective pixels of road surface area image A, which is a minimum road surface area image, is set to equal to or less than 3 which is a permissible value.

As described above, according to this embodiment, in calibration apparatus 700, among a plurality of partial images (in other words, road surface area images) which are extracted by extraction processing section 114, when a difference between number P1 of effective pixels of a first partial image and number P2 of effective pixels of a second partial image (P1>P2) is greater than a threshold, area adjustment section 701 reduces the number of effective pixels of the first partial image until the difference becomes equal to or less than the threshold.

In this manner, since the numbers of effective pixels between the partial images can be brought close to being equal to each other, it is possible to increase the calculation accuracy of installation state parameters.

Meanwhile, in the above description, a process of adjusting a number of pixels is performed using all the plurality of road surface area images extracted by area image extraction section 103 as one group, but the present invention is not limited thereto. The plurality of road surface area images extracted by area image extraction section 103 may be divided into a plurality of groups, and the process of adjusting a number of pixels may be performed for each group.

FIGS. 23A to 23C are diagrams for describing a process of adjusting a number of pixels which is performed for each of two groups into which four road surface area images are divided.

FIG. 23A is a table illustrating a permissible value for each group. In FIG. 23A, road surface area images A and C form group 1, and road surface area images B and D form group 2. That is, two road surface area images lined up in a longitudinal direction form one group, and two road surface area images lined up in a transverse direction form one group. A permissible value for group 1 is 2, and a permissible value for group 2 is 3.

A linear regression analysis method such as multiple regression analysis which is used when installation state calculation section 104 calculates a plane equation of a road surface is used to calculate a correlation between a plurality of measured values. Meanwhile, in this embodiment, the plurality of measured values are three-dimensional positions of effective pixels. Therefore, as the three-dimensional positions of the effective pixels are further away from each other, installation state calculation section 104 can calculate the plane equation of the road surface with a higher level of accuracy. That is, as the number of effective pixels that are far away from the centroid of an area setting frame increases, and as a direction from the centroid of the area setting frame to the effective pixel deviates less, installation state calculation section 104 can calculate the plane equation of the road surface with a higher level of accuracy.

When the distances of the area setting frame from a reference point are greatly different from each other in a longitudinal direction and transverse direction, or when the sizes of the area setting frame are different from each other in the longitudinal direction and transverse direction, area adjustment section 701 individually sets optimal permissible values in the longitudinal direction and transverse direction.

Thus, the number of effective pixels that are far away from the centroid of the area setting frame increases, or the deviation of a direction from the centroid of the area setting frame to the effective pixel is reduced. As a result, installation state calculation section 104 can calculate the plane equation of the road surface with a high level of accuracy.

Meanwhile, the centroid of the area setting frame is the centroid of the center of each area setting frame. In addition, when the sizes of all the area setting frames are the same and the distances of the area setting frame from the reference point in the longitudinal direction and transverse direction are the same as each other, the centroid of the area setting frame is consistent with the reference point.

FIG. 23B is the same diagram as that shown in FIG. 22A. In FIG. 23B, the number of effective pixels of road surface area image A is set to 50, the number of effective pixels of road surface area image B is set to 55, the number of effective pixels of road surface area image C is set to 56, and the number of effective pixels of road surface area image D is set to 51.

The processes of step S804 to step S807 are performed in group units on the plurality of road surface area images illustrated in FIG. 23B, and thus a result illustrated in FIG. 23C is obtained.

[Embodiment 3]

In Embodiment 2, an adjustment process between road surface area images is performed during a flow of a series of processes from the acquisition of a stereo image to the calculation of installation state parameters. However, an imbalance of the number of effective pixels between the road surface area images may also arise in a case where the setting of an arrangement pattern is fixed. Consequently, Embodiment 3 relates to an adjustment process between the road surface area images in a case where the setting of the arrangement pattern is fixed.

[Configuration of Calibration Apparatus 900]

Figure 24:
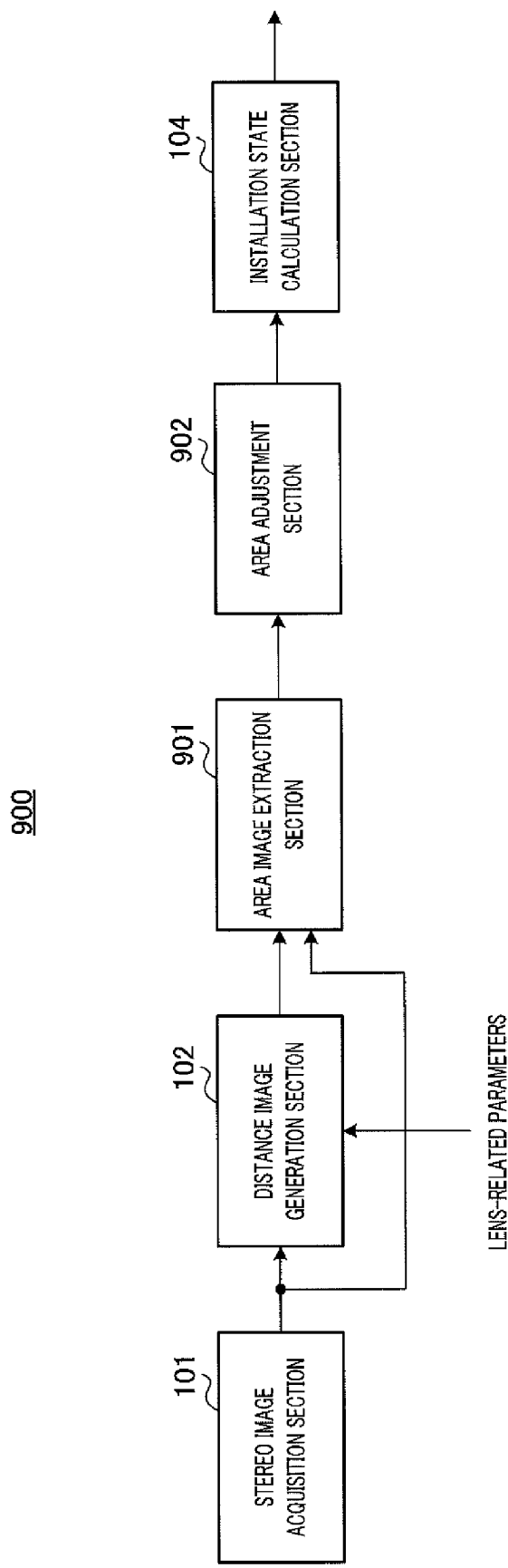
FIG. 24 is a block diagram illustrating a configuration of a calibration apparatus according to Embodiment 3 of the present invention.

FIG. 24 illustrates a configuration of calibration apparatus 900 according to Embodiment 3 of the present invention. In FIG. 24, calibration apparatus 900 includes area image extraction section 901 and area adjustment section 902.

Area image extraction section 901 extracts, from a distance image, a plurality of partial images (in other words, plurality of road surface area images) which correspond to a plurality of area setting frames included in an arrangement pattern of which pattern is fixed.

Figure 25:
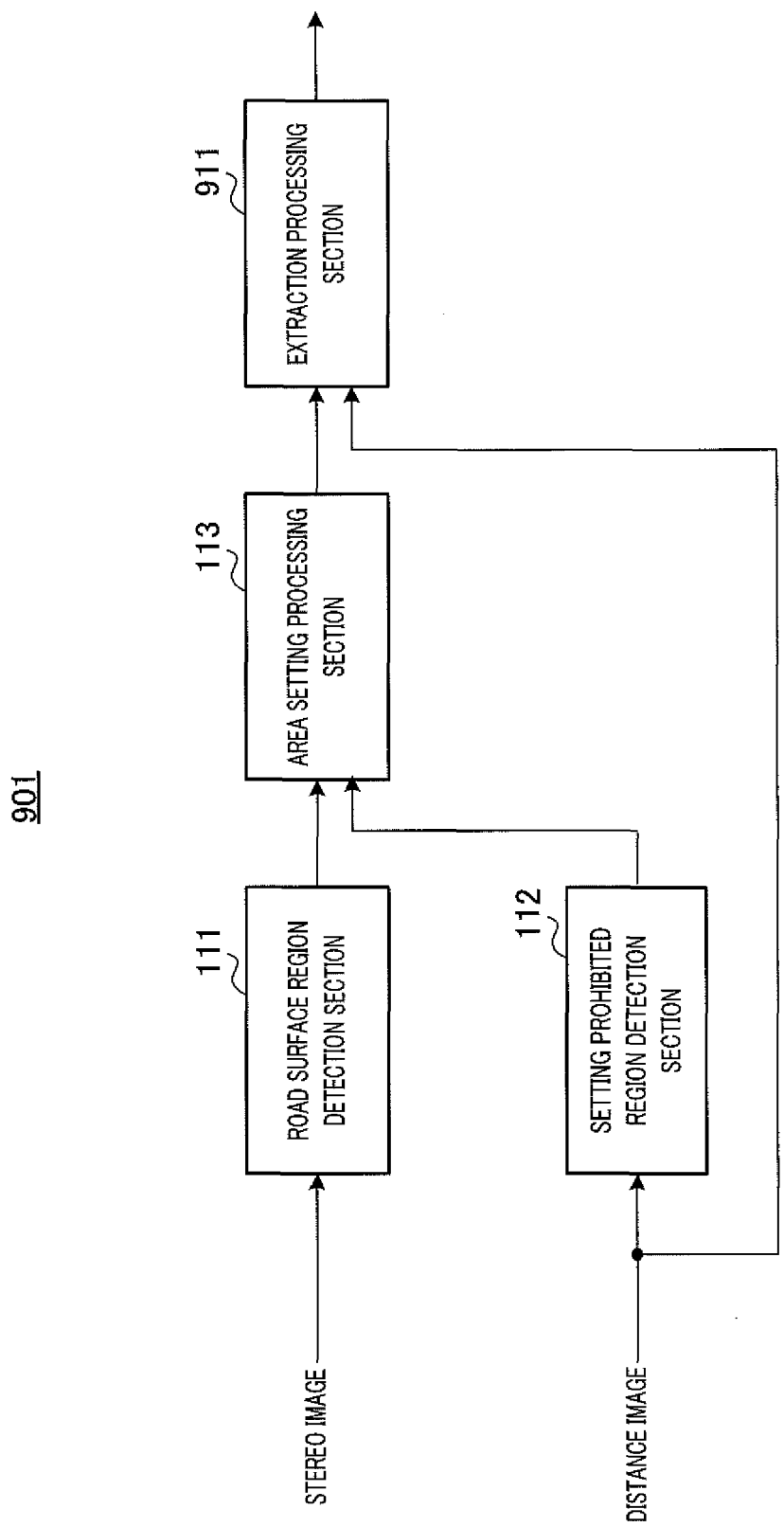
FIG. 25 is a block diagram illustrating a configuration of an area image extraction section.

Specifically, as illustrated in FIG. 25, area image extraction section 901 includes extraction processing section 911. Extraction processing section 911 extracts, from a distance image, a plurality of partial images (in other words, plurality of road surface area images) which correspond to a plurality of area setting frames included in an arrangement pattern of which the setting is fixed.

In a plurality of road surface area images extracted by area image extraction section 901, when a difference between number P1 of effective pixels of a first road surface area image and number P2 of effective pixels of a second road surface area image (P1>P2) is greater than a second threshold, area adjustment section 902 reduces the number of effective pixels of the first road surface area image until the difference becomes equal to or less than the second threshold. The second threshold is a natural number equal to or greater than 1, and is smaller than a first threshold.

Specifically, area adjustment section 902 specifies a road surface area image (hereinafter, referred to as "minimum road surface area image") which has a minimum number of effective pixels in the plurality of road surface area images extracted by area image extraction section 901. Then, area adjustment section 902 reduces the number of effective pixels of each of the road surface area images other than the minimum road surface area image in the plurality of road surface area images extracted by area image extraction section 901, until a difference between the number of effective pixels of each of the road surface area images and the number of effective pixels of the minimum road surface area image becomes equal to or less than the second threshold.

[Operation of Calibration Apparatus 900]

An operation of calibration apparatus 900 having the above-mentioned configuration will be described below.

(During Initial Setting)

During the initial setting of an arrangement pattern, calibration apparatus 900 operates in the same manner as calibration apparatus 100 described in Embodiment 1.

That is, in area image extraction section 901, extraction processing section 911 extracts, from a distance image, a plurality of partial images (in other words, plurality of road surface area images) which correspond to a plurality of area setting frames included in an arrangement pattern of which main setting is performed by area setting processing section 113. At this time, extraction processing section 911 holds the arrangement pattern of which main setting is performed by area setting processing section 113, fixes the arrangement pattern, and uses the fixed arrangement pattern at the time of operation.

(During Operation)

During the operation of calibration apparatus 100 (hereinafter, simply referred to as "at the time of operation"), extraction processing section 911 extracts, from a distance image, a plurality of partial images (in other words, plurality of road surface area images) which correspond to a plurality of area setting frames included in an arrangement pattern of which the setting is fixed.

Here, even if the arrangement pattern is set to be in a good state at the time of initial setting, the arrangement pattern that is set at the time of initial setting may not sometimes be appropriate for the distance image obtained at the time of operation. FIG. 26 are diagrams illustrating a case where the arrangement pattern that is set at the time of initial setting is not appropriate for the distance image obtained at the time of operation.

Figure 26C:
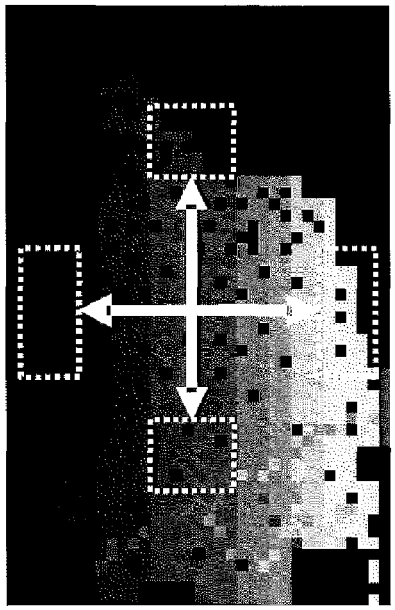
FIGS. 26A to 26D are diagrams illustrating a distance image at the time of initial setting on which an arrangement pattern is superimposed.
Figure 26D:
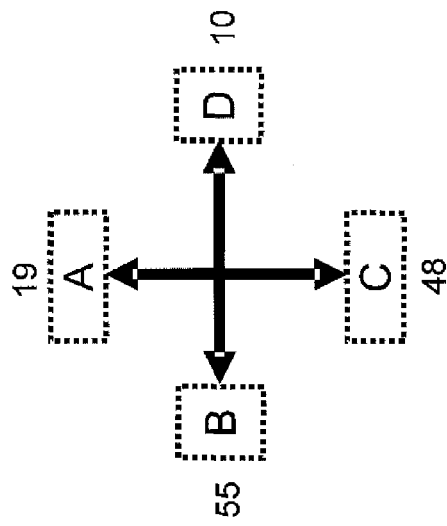
Figure 26A:
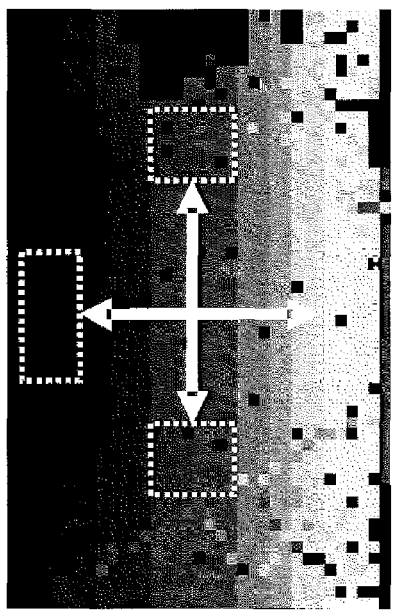
Figure 26B:
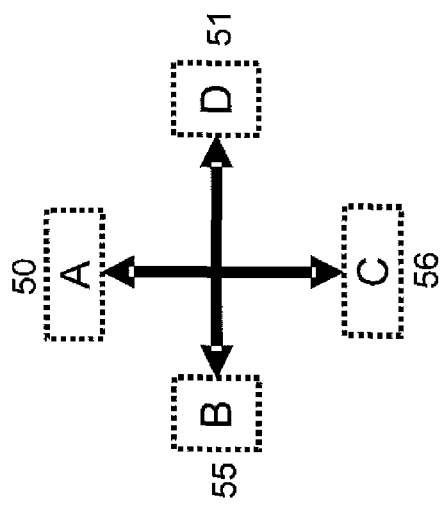

FIG. 26A illustrates a distance image at the time of initial setting on which an arrangement pattern is superimposed. As illustrated in FIG. 26B, the numbers of effective pixels of road surface area images A to D extracted on the basis of the arrangement pattern that is set at the time of initial setting are 50, 55, 56, and 51, respectively. That is, the numbers of effective pixels of road surface area images A to D are substantially equal to each other. Therefore, the numbers of effective pixels of road surface area images A to D are in a balanced state, and thus a process of calculating installation state parameters is not greatly influenced by a specific road surface area image having a large number of effective pixels.

However, when an imaging apparatus including calibration apparatus 900 is installed outdoors, there is a possibility of the balance of the number of effective pixels between the road surface area images being lost due to the influence of sunshine or the like at the time of operation. FIG. 26C illustrates an example of a distance image at the time of operation on which an arrangement pattern is superimposed. As illustrated in FIG. 26D, the numbers of effective pixels of road surface area images A to D extracted at the time of operation are 19, 55, 48, and 10, respectively. That is, the balance of the number of effective pixels between the road surface area images is lost, and when the process of calculating installation state parameters is performed in a state where the balance of the number of effective pixels between the road surface area images is lost, the calculation results are greatly influenced by a road surface area image having a large number of effective pixels. As a result, the calculation accuracy of the installation state parameters is reduced.

Consequently, in this embodiment, area adjustment section 902 performs a process of adjusting the number of effective pixels between the road surface area images at the time of operation. The adjustment process is the same as the process described in Embodiment 2.

Meanwhile, in the above description, at the time of initial setting of an arrangement pattern, the same process as the process of setting an arrangement pattern using calibration apparatus 100 of Embodiment 1 is performed, and thus the setting of the arrangement pattern is fixed. However, the present invention is not limited thereto, and the setting of the arrangement pattern may be fixed from the beginning.

As described above, according to this embodiment, in calibration apparatus 900, extraction processing section 911 extracts, from a distance image, a plurality of partial images (in other words, road surface area images) which correspond to a plurality of area setting frames included in an arrangement pattern of which the setting is fixed. In a plurality of road surface area images extracted by area image extraction section 901, when a difference between number P1 of effective pixels of a first road surface area image and number P2 of effective pixels of a second road surface area image (P1>P2) is greater than a second threshold, area adjustment section 902 reduces the number of effective pixels of the first road surface area image until the difference becomes equal to or less than the second threshold.

In this manner, since the numbers of effective pixels between the partial images can be brought close to being equal to each other even if the setting of the arrangement pattern is fixed, it is possible to increase the calculation accuracy of installation state parameters.

In particular, when the arrangement pattern set by the above-mentioned process at the time of initial setting is fixed, it is possible to bring the numbers of effective pixels used for calculating of installation state parameters close to being equal to each other between a plurality of partial images even though a variation occurs in the number of non-effective pixels between the plurality of partial images due to the influence of sunshine or the like at the time of operation. As a result, it is possible to increase the calculation accuracy of installation state parameters.

In the embodiments described above, the present invention is described, as an example, using a case where the present invention is implemented as hardware. However, the present invention can be achieved through software in concert with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Applications No. 2011-126240, filed on Jun. 6, 2011, including the specification, drawings and abstract, is incorporated herein by reference in their entirety.

INDUSTRIAL APPLICABILITY

A calibration apparatus and calibration method of the present invention are useful in that it is possible to calculate an installation state of a stereo camera without physically disposing a marker.

REFERENCE SIGNS LIST 100, 700, 900 Calibration apparatus
101 Stereo image acquisition section
102 Distance image generation section
103, 901 Area image extraction section
104 Installation state calculation section
111 Road surface region detection section
112 Setting prohibited region detection section
113 Area setting processing section
114, 911 Extraction processing section
200 Imaging apparatus
201, 202 Monocular camera
203 Stereo image generation section
204 Lens-related parameter calculation section
205 Calibration section
301 Area setting frame
302 Reference point
303 Area setting frame
304 Reference point
601 Setting prohibited region
701, 902 Area adjustment section
1101 Road surface image region
1501 Reference point
1502 Area setting frame

The invention claimed is:
1. A calibration apparatus comprising:
distance image generation circuitry which, in operation, calculates a distance from a stereo camera for each of a plurality of pixels included in a stereo image including a road surface and that generates a distance image in which each of the plurality of pixels is associated with the calculated distance;
first region detection circuitry which, in operation, detects a road surface image region based on the stereo image including the road surface;
second region detection circuitry which, in operation, detects a setting prohibited region including a group of non-effective pixels with which calculating the distance in the distance image is not possible;
area setting processing circuitry which, in operation, adjusts an arrangement pattern in a direction in which positions of a plurality of area setting frames become distant from each other, based on the road surface image region and the setting prohibited region;
extraction processing that circuitry which, in operation, extracts, from the distance image, a plurality of partial images corresponding to the plurality of area setting frames included in the adjusted arrangement pattern; and calculation circuitry which, in operation, calculates an installation state parameter used in an installation state of the stereo camera of the stereo image, based on the plurality of extracted partial images.

2. The calibration apparatus according to claim 1, wherein the area setting processing circuitry adjusts, in a state where a position of a reference point of the arrangement pattern is fixed, the arrangement pattern by moving the area setting frames to be mutually distant from the reference point up until immediately before each of the area setting frames and the setting prohibited image region overlap each other while each of the area setting frames and the road surface image region overlap each other.

3. The calibration apparatus according to claim 1, further comprising an adjustment circuitry that, when a difference between a number P1 of effective pixels of a first partial image and a number P2 of effective pixels of a second partial image, where P1>P2, in the plurality of extracted partial images is greater than a threshold, reduces the number of effective pixels of the first partial image until the difference becomes equal to or less than the threshold.

4. The calibration apparatus according to claim 3,
wherein the adjustment circuitry reduces the number of effective pixels of the first partial image by deleting an effective pixel of the first partial image, the effective pixel being associated with a distance away from the stereo camera in the distance image.

5. The calibration apparatus according to claim 3, wherein the adjustment circuitry reduces the number of effective pixels of the first partial image by deleting an effective pixel of the first partial image, the effective pixel being distant from a center of the distance image.

6. The calibration apparatus according to claim 2, wherein the area setting processing circuitry switches the position at which the reference point of the arrangement pattern is fixed, based on characteristics of a lens used for capturing of the stereo image including the road surface.

7. A calibration method comprising:
calculating, by a calibration apparatus, a distance from a stereo camera for each of a plurality of pixels included in a stereo image including a road surface;
generating, by the calibration apparatus, a distance image in which each of the plurality of pixels is associated with the calculated distance;
detecting, by the calibration apparatus, a road surface image region based on the stereo image including the road surface;
detecting, by the calibration apparatus, a setting prohibited region including a group of non-effective pixels with which calculating the distance in the distance image is not possible;
adjusting, by the calibration apparatus, an arrangement pattern in a direction in which a plurality of area setting frames become distant from each other, based on the road surface image region and the setting prohibited region;
extracting, by the calibration apparatus, from the distance image, a plurality of partial images corresponding to the plurality of area setting frames included in the adjusted arrangement pattern; and
calculating, by the calibration apparatus, an installation state parameter used in an installation state of the stereo camera, based on the plurality of extracted partial images.

8. The calibration method according to claim 7, further comprising:
adjusting, in a state where a position of a reference point of the arrangement pattern is fixed, the arrangement pattern by moving the area setting frames to be mutually distant from the reference point up until immediately before each of the area setting frames and the setting prohibited image region overlap each other while each of the area setting frames and the road surface image region overlap each other.

9. The calibration method according to claim 7, further comprising:
when a difference between a number P1 of effective pixels of a first partial image and a number P2 of effective pixels of a second partial image, where P1>P2, in the plurality of extracted partial images is greater than a threshold, reducing the number of effective pixels of the first partial image until the difference becomes equal to or less than the threshold.

10. The calibration method according to claim 9,
wherein the reducing the number of effective pixels of the first partial image includes deleting an effective pixel of the first partial image, the effective pixel being associated with a distance away from the stereo camera in the distance image.

11. The calibration method according to claim 9,
wherein the reducing the number of effective pixels of the first partial image includes deleting an effective pixel of the first partial image, the effective pixel being associated with a distance away from a center of the distance image.

12. The calibration method according to claim 7, further comprising:
switching the position at which the reference point of the arrangement pattern is fixed, based on characteristics of a lens used for capturing of the stereo image including the road surface.

* * * * *